United States Patent [19]
Akazaki et al.

[11] Patent Number: 5,937,638
[45] Date of Patent: Aug. 17, 1999

[54] METHOD OF JUDGING DETERIORATION OF CATALYTIC CONVERTER FOR PURIFYING EXHAUST GAS

[75] Inventors: Shusuke Akazaki; Kohei Hanada; Yuji Yasui; Yoshikazu Oshima, all of Wako, Japan

[73] Assignee: Honda Giken Kogyo Kabushiki Kaisha, Tokyo, Japan

[21] Appl. No.: 08/974,505

[22] Filed: Nov. 19, 1997

[30] Foreign Application Priority Data

Nov. 19, 1996 [JP] Japan .................................. 8/307736
Oct. 8, 1997 [JP] Japan .................................. 9/275597

[51] Int. Cl.$^6$ ..................................................... F01N 3/20
[52] U.S. Cl. ............................... 60/274; 60/276; 60/277; 60/285
[58] Field of Search ........................... 60/274, 276, 277, 60/285

[56] References Cited

U.S. PATENT DOCUMENTS

| | | | |
|---|---|---|---|
| 5,127,225 | 7/1992 | Nada ........................................ | 60/277 |
| 5,134,847 | 8/1992 | Ogawa et al. ............................ | 60/274 |
| 5,303,548 | 4/1994 | Shimizu et al. .......................... | 60/277 |
| 5,737,916 | 4/1998 | Mitsutani ................................. | 60/276 |
| 5,848,527 | 12/1998 | Mitsutani ................................. | 60/274 |

FOREIGN PATENT DOCUMENTS

| | | |
|---|---|---|
| 5-79374 | 3/1993 | Japan . |
| 5-321721 | 12/1993 | Japan . |
| 7-19033 | 1/1995 | Japan . |
| 7-83094 | 3/1995 | Japan . |
| 8-21273 | 1/1996 | Japan . |
| 8-105345 | 4/1996 | Japan . |
| 2526640 | 6/1996 | Japan . |

*Primary Examiner*—Thomas E. Denion
*Attorney, Agent, or Firm*—Nikaido, Marmelstein, Murray & Oram LLP

[57] ABSTRACT

A deterioration of a catalytic converter for purifying an exhaust gas produced by burning a mixture of a fuel and air in an internal combustion engine, for example, is judged by supplying the exhaust gas to the catalytic converter, detecting the amount of a predetermined component of the exhaust gas which has passed through the catalytic converter with an exhaust gas sensor disposed downstream of the catalytic converter, calculating a target air-fuel ratio for the exhaust gas to be supplied to the catalytic converter for achieving a predetermined emission purifying capability of the catalytic converter based on a detected output signal from the exhaust gas sensor, and judging a deteriorated state of the catalytic converter based on the calculated target air-fuel ratio.

40 Claims, 13 Drawing Sheets

METHOD OF JUDGING DETERIORATION OF CATALYTIC CONVERTER FOR PURIFYING EXHAUST GAS

BACKGROUND OF THE INVENTION

1. Field of the Invention

The present invention relates to a method of judging a deterioration of a catalytic converter installed in the exhaust system of an internal combustion engine.

2. Description of the Prior Art

Internal combustion engines such as automotive engines are required to incorporate a catalytic converter in their exhaust system for purifying an exhaust gas as much as possible from the standpoint of environmental protection. There has been proposed a system combined with an internal combustion engine and having an air-fuel ratio sensor disposed upstream of a catalytic converter for detecting the air-fuel ratio of an exhaust gas and an exhaust gas sensor disposed downstream of the catalytic converter for detecting the content of a certain component in the exhaust gas, e.g., the concentration of oxygen contained in the exhaust gas. The proposed system controls the air-fuel ratio of the internal combustion engine to enable the catalytic converter to perform an optimum emission purifying capability according to a feedback control process based on detected output signals from the air-fuel ratio sensor and the exhaust gas sensor. For details of the proposed system, reference should be made to Japanese patent application No. 5-321721 corresponding to U.S. Pat. No. 5,426,935 and Japanese patent application No. 8-84047 corresponding to U.S. patent application Ser. No. 08/833091.

The system operates on the basis of a finding that the catalytic converter can purify the exhaust gas optimally by controlling the air-fuel ratio of the exhaust gas that enters the catalytic converter such that the concentration of oxygen contained in the exhaust gas that has passed through the catalytic converter will be of a certain constant value. Based on such a finding, the system determines a target air-fuel ratio for the exhaust gas that enters the catalytic converter such that the detected output signal from the exhaust gas sensor (oxygen concentration sensor) positioned down-stream of the catalytic converter will be of a certain constant value. When the detected output signal from the exhaust gas sensor (oxygen concentration sensor) positioned down-stream of the catalytic converter is of the certain constant value, the target air-fuel ratio may be corrected such that the detected output signal from the air-fuel ratio sensor positioned upstream of the catalytic converter will be of a stoicheometric air-fuel ratio. The air-fuel ratio of an air-fuel mixture to be burned in the internal combustion engine is controlled by a feedback control process, i.e., the rate of fuel supplied to the internal combustion engine is controlled by a feedback control process, for converging the detected output signal from the air-fuel ratio sensor toward the target air-fuel ratio.

The emission purifying capability of the catalytic converter decreases because of aging, use of inappropriate fuels, etc. When the catalytic converter is deteriorated to some extent, it is desirable to determine the deterioration.

Conventional processes of judging a deterioration of catalytic converters are disclosed in Japanese patent No. 2,526,640 corresponding to U.S. Pat. No. 5,088,281 and Japanese laid-open patent publication No. 7-19033.

According to the process shown in Japanese patent No. 2,526,640 which corresponds to U.S. Pat. No. 5,088,281, while the internal combustion engine is operating usually, since detected output signals from the oxygen concentration sensors disposed respectively upstream and down-stream of the catalytic converter are reversed between leaner and richer values of the air-fuel ratio, the rate of fuel supplied to the internal combustion engine is increased or reduced depending on a reversal of the detected output signals from the oxygen concentration sensors for thereby controlling. the air-fuel ratio according to a feedback control process so as to be kept in the vicinity of the stoicheometric air-fuel ratio. When the internal combustion engine increases its output power, the rate of fuel supplied to the internal combustion engine is determined by an open-loop control process. In the open-loop control process, a period of time from the time when the detected output signal from the oxygen concentration sensor upstream of the catalytic converter is reversed from the leaner value to the richer value to the time when the detected output signal from the oxygen concentration sensor down-stream of the catalytic converter is reversed from the leaner value to the richer value is measured, and a deterioration of the catalytic converter is determined on the basis of the measured period of time.

The process shown in Japanese laid-open patent publication No. 7-19033 also employs the reversal of the detected output signals from the oxygen concentration sensors upstream and down-stream of the catalytic converter, as with the process disclosed in Japanese patent No. 2,526,640. According to this process, the air-fuel ratio of the internal combustion engine is controlled by a feedback control process so as to be maintained at a target value depending on the detected output signals from the oxygen concentration sensors. If certain conditions are satisfied, i.e., if the load and rotational speed of the internal combustion engine fall in predetermined ranges, while in the feedback control process, then a deterioration of the catalytic converter is determined on the basis of the detected output signals from the oxygen concentration sensors upstream and down-stream of the catalytic converter. Specifically, with the air-fuel ratio being corrected at a greater degree in the feedback control process than usually, the time of a response delay of the reversal of the detected output signal from the down-stream oxygen concentration sensor with respect to the reversal of the detected output signal from the upstream oxygen concentration sensor, and the period of the reversal of the detected output signal from the down-stream oxygen concentration sensor are measured, and a deterioration of the catalytic converter is determined on the basis of the measurements.

However, these processes of judging a deterioration of the catalytic converter have been disadvantageous as described below.

According to the processes disclosed in Japanese patent No. 2,526,640 corresponding to U.S. Pat. No. 5,088,281 and Japanese laid-open patent publication No. 7-19033, while the air-fuel ratio of the internal combustion engine is being controlled by the feedback control process based on the detected output signals from the oxygen concentration sensors upstream and down-stream of the catalytic converter to enable the catalytic converter to perform an optimum emission purifying capability, it is impossible to judge a deterioration of the catalytic converter. In order to judge a deterioration of the catalytic converter, it is necessary to control the air-fuel ratio of the internal combustion engine according to the open-loop control process or correct the air-fuel ratio at a greater degree in the feed-back control process than usually. Stated otherwise, judging a deterioration of the catalytic converter requires the air-fuel ratio of the internal combustion engine to be controlled in a special mode different from a usual mode. As a consequence, the control system for the internal combustion engine is relatively complex.

Particularly, according to the processes disclosed in Japanese patent No. 2,526,640 corresponding to U.S. Pat. No. 5,088,281 and Japanese laid-open patent publication No. 7-19033, inasmuch as the air-fuel ratio of the internal combustion engine needs to be controlled in a special (dedicated) mode, which is different from the usual mode for controlling the air-fuel ratio to enable the catalytic converter to perform an optimum emission purifying capability, in order to judge a deterioration of the catalytic converter, it is difficult for the catalytic converter to keep the optimum emission purifying capability when a deterioration of the catalytic converter is to be judged.

Furthermore, because it is impossible to judge a deterioration of the catalytic converter while the internal combustion engine is operating usually with the air-fuel ratio being controlled by the feedback control process to enable catalytic converter to keep the optimum emission purifying capability, there are few opportunities to judge a deterioration of the catalytic converter, and hence the determination of a deterioration of the catalytic converter is not reliable.

SUMMARY OF THE INVENTION

It is therefore an object of the present invention to provide a method of accurately judging a deterioration of a catalytic converter without having to specially control the air-fuel ratio of an air-fuel mixture to produce an exhaust gas supplied to the catalytic converter, while maintaining a desired emission purifying capability for the catalytic converter.

The inventors of the present invention have conducted various experiments and analyses about the emission purifying capability of catalytic converters, and obtained the following data and findings:

FIGS. 1 and 2 of the accompanying drawings show data representing the relationship between the air-fuel ratio of an exhaust gas supplied from an internal combustion engine which burns gasoline to a catalytic converter installed in an exhaust system of the internal combustion engine, the air-fuel ratio being detected upstream of the catalytic converter and corresponding to the air-fuel ratio of an air-fuel mixture burned in the internal combustion engine, and purification percentages in the catalytic converter of nitrogen oxide NOx (see FIG. 1) and hydrocarbon HC (see FIG. 2), the data being indicative of a plurality of catalytic converters (four catalytic converters in FIGS. 1 and 2) suffering different deteriorations. As can be seen from FIGS. 1 and 2, the air-fuel ratio of the exhaust gas upstream of the catalytic converter for maximizing the emission purification capability (purification percentage) thereof is shifted toward a leaner side as the catalytic converter is deteriorated.

Although not shown, such a tendency holds true with carbon monoxide (CO). The various experiments and analyses conducted by the inventors have also indicated that if a compressed natural gas (CNG) is used as the fuel of the internal combustion engine, then the air-fuel ratio of the exhaust gas upstream of the catalytic converter for maximizing the emission purification capability thereof is shifted toward a richer side as the catalytic converter is deteriorated, unlike the data shown in FIGS. 1 and 2. This appears to be caused by a different molecular structure of the fuel.

As described above, although the air-fuel ratio of the exhaust gas upstream of the catalytic converter for maximizing the emission purification capability thereof is shifted in different directions depending on the type of a fuel, e.g., gasoline, CNG, gas oil, alcohol, etc., which generates the exhaust gas supplied to the catalytic converter, the air-fuel ratio is shifted toward the leaner side or the richer side as the catalytic converter is deteriorated.

FIG. 3 of the accompanying drawings shows data representing the detected output signal from an oxygen concentration sensor ($O_2$ sensor) disposed down-stream of the catalytic converter, the data being measured when the data shown in FIGS. 1 and 2 were measured. A comparison between the data shown in FIG. 3 and the data shown in FIGS. 1 and 2 indicates that the output signal of the oxygen concentration sensor (the concentration of oxygen contained in the exhaust gas that has passed through the catalytic converter) has a substantially constant level VO regardless of the degree of deterioration of the catalytic converter, at the air-fuel ratio of the exhaust gas upstream of the catalytic converter for maximizing the emission purification percentage thereof with respect to NOx, HC, etc. Stated otherwise, the air-fuel ratio of the exhaust gas upstream of the catalytic converter for keeping the output signal of the oxygen concentration sensor down-stream of the catalytic converter at the substantially constant level VO is the air-fuel ratio of the exhaust gas for maximizing the emission purification percentage thereof with respect to NOx, HC, etc.

It can thus be seen from the above analysis that if a target air-fuel ratio for the exhaust gas supplied to the catalytic converter is determined to maximize the emission purification percentage of the catalytic converter with respect to NOx, HC, etc. (i.e., to maximize the purification capability with respect to NOx, HC, etc., or to keep the oxygen concentration in the purified exhaust gas downstream of the catalytic converter at a predetermined constant level, and the air-fuel ratio of the exhaust gas supplied to the catalytic converter is controlled at the target air-fuel ratio, then the value of the target air-fuel ratio or the value of the air-fuel ratio of the exhaust gas that is controlled at the target air-fuel ratio basically depends on the degree of deterioration of the catalytic converter, and is shifted toward the leaner side or the richer side as the catalytic converter is deteriorated.

The degree to which the air-fuel ratio of the exhaust gas is shifted to the leaner side or the richer side varies depending on the difference between characteristics of catalysts of catalytic converter, i.e., the difference between types or amounts of precious metals of the catalysts. Specifically, the degree to which the air-fuel ratio of the exhaust gas upstream of the catalytic converter is shifted is about 0.2 A/F from a new catalytic converter (as indicated by the solid lines in FIGS. 1 and 2) to a deteriorated catalytic converter (as indicated by the two-dot-and-dash lines in FIGS. 1 and 2), and the degree varies depending on the characteristics of the catalyst.

According to the various experiments and analyses conducted by the inventors, the air-fuel ratio of the exhaust gas upstream of the catalytic converter for maximizing the emission purification capability or keeping the oxygen concentration in the purified exhaust gas downstream of the catalytic converter at a predetermined constant level (the air-fuel ratio will be referred to as a "purification-optimizing air-fuel ratio") is affected by operating states of the catalytic converter, e.g., the amount of the exhaust gas flowing through the catalytic converter, i.e., the rate at which the exhaust gas flows, the active state of the catalytic converter, etc., and is especially affected by the amount of the exhaust gas. FIG. 4 of the accompanying drawings shows data representative of the relationship between the amount of an exhaust gas flowing through a catalytic converter, which is installed in an exhaust system of an internal combustion engine using gasoline as the fuel, and the purification-optimizing air-fuel ratio for keeping the output signal of an oxygen concentration sensor disposed downstream of the catalytic converter at the predetermined level V0, the data being indicative of a new catalytic converter and a deteriorated catalytic converter. In FIG. 4, white dots represent measured data of the new catalytic converter, and black dots measured data of the deteriorated catalytic converter. The solid-line and two-dot-and-dash-line curves in FIG. 4 represent correlations between the purification-optimizing air-fuel ratio and the amount of the exhaust gas with respect to the new catalytic converter and the deteriorated catalytic converter, respectively. These curves are approximate curves show an overall tendency of the measured data, and are determined from the measured data according to a method of least squares or the like.

As can be understood from FIG. 4, the purification-optimizing air-fuel ratio tends to go basically toward the leaner side as the amount of the exhaust gas increases. A comparison between the solid-line curve and the two-dot-and-dash-line curve reveals that the purification-optimizing air-fuel ratio at each amount of the exhaust gas is shifted more toward the leaner side with the deteriorated catalytic converter than with the new catalytic converter. The amount of the exhaust gas represented by the horizontal axis shown in FIG. 4 should more specifically be defined as the ratio of the actual flow rate of the exhaust gas to the effective volume (actual flow rate/effective volume) of the catalytic converter which is determined depending on the active state of the catalytic converter, etc. The effective volume of the catalytic converter is more or less affected by the active state of the catalytic converter such that if the activation of the catalytic converter is insufficient, then the effective volume of the catalytic converter is slightly smaller than if the activation of the catalytic converter is sufficient. Therefore, if the activation of the catalytic converter is insufficient though the actual flow rate of the exhaust gas is constant, then the purification-optimizing air-fuel ratio is shifted more toward the richer side than if the activation of the catalytic converter is sufficient.

The purification-optimizing air-fuel ratio thus basically depends on the degree of deterioration of the catalytic converter, but is also influenced by operating states of the catalytic converter, e.g., the amount of the exhaust gas flowing through the catalytic converter, the active state of the catalytic converter, etc., especially by the amount of the exhaust gas.

As is apparent from FIG. 4, a comparison between the new and deteriorated catalytic converters with respect to the rate of change of the purification-optimizing air-fuel ratio with respect to a change in the amount of the exhaust gas, e.g., a deviation δ, shows that the deviation δ of the deteriorated catalytic converter tends to be smaller than the deviation δ of the new catalytic converter. Therefore, the rate of change of the purification-optimizing air-fuel ratio with respect to a change in the amount of the exhaust gas, or more generally the rate of change of the purification-optimizing air-fuel ratio with respect to a change in the operating states of the catalytic converter, depends on the degree of deterioration of the catalytic converter.

A method of judging a deterioration of a catalytic converter for purifying an exhaust gas according to the present invention has been made on the basis of the above findings.

According to a first aspect in a first mode of the present invention, there is provided a method of judging a deterioration of a catalytic converter for purifying an exhaust gas produced by burning a mixture of a fuel and air, comprising the steps of supplying the exhaust gas to the catalytic converter, detecting the amount of a predetermined component of the exhaust gas which has passed through the catalytic converter with an exhaust gas sensor disposed downstream of the catalytic converter, calculating a target air-fuel ratio for the exhaust gas to be supplied to the catalytic converter for achieving a predetermined emission purifying capability of the catalytic converter based on a detected output signal from the exhaust gas sensor, and judging a deteriorated state of the catalytic converter based on the calculated target air-fuel ratio.

In the first mode of the present invention, the target air-fuel ratio determined when the exhaust gas is supplied to the catalytic converter is determined as the air-fuel ratio for the exhaust gas to be supplied to the catalytic converter for achieving a predetermined emission purifying capability of the catalytic converter based on the detected output signal from the exhaust gas sensor, which represents a result of purification of the exhaust gas by the catalytic converter. Therefore, the target air-fuel ratio indicates the air-fuel ratio (corresponding to the purification-optimizing air-fuel ratio described above) of the exhaust gas upstream of the catalytic converter to enable the catalytic converter to achieve its desired emission purifying capability (e.g., maximum emission purifying capability). Therefore, the value of the target air-fuel ratio or a rate of change of the target air-fuel ratio with respect to a change of an operating state of the catalytic converter depends on a degree of deterioration of the catalytic converter. A deteriorated state of the catalytic converter can thus be judged on the basis of the data of the target air-fuel ratio. Inasmuch as the judgment of a deteriorated state of the catalytic converter is made on the basis of the data of the calculated target air-fuel ratio, it is not necessary to effect a special (dedicated) control process for controlling the air-fuel ratio of the mixture for generating the exhaust gas supplied to the catalytic converter, e.g., a control process for controlling the air-fuel ratio of the mixture in a manner to sacrifice the emission purifying capability of the catalytic converter.

According to the first mode of the present invention, therefore, it is possible to judge a deteriorated state of the catalytic converter without having to specially control the air-fuel ratio of the mixture for generating the exhaust gas supplied to the catalytic converter.

In the first mode of the present invention, the data of the target air-fuel ratio includes not only the target air-fuel ratio, but also a quantity which defines the target air-fuel ratio, e.g., an adjustment quantity for the target air-fuel ratio which is produced in the process of calculating the target air-fuel ratio.

In the first mode of the present invention, according to a second aspect, the method should preferably further comprise the step of controlling the air-fuel ratio of the mixture so as to equalize the air-fuel ratio of the exhaust gas supplied to the catalytic converter with the target air-fuel ratio.

The step of controlling the air-fuel ratio of the mixture may be effected according to a feedforward controlling process based on the target air-fuel ratio. More preferably, according to a third aspect, the step of controlling the air-fuel ratio of the mixture comprises the steps of detecting the air-fuel ratio of the exhaust gas supplied to the catalytic converter with an air-fuel ratio sensor disposed upstream of the catalytic converter, and feedback-controlling the air-fuel ratio of the mixture so as to converge a detected output signal from the air-fuel ratio sensor toward the target air-fuel ratio.

The feedback controlling process makes it possible to control the air-fuel ratio of the exhaust gas supplied to the catalytic converter (the detected output signal from the air-fuel ratio sensor) appropriately at the target air-fuel ratio which enables the catalytic converter to achieve its desired emission purifying capability, stabilizing the purification of the exhaust gas by the catalytic converter and hence stabilizing the detected output signal from the air-fuel ratio sensor which is indicative of the purified condition. Therefore, the calculation of the target air-fuel ratio based on the detected output signal from the air-fuel ratio sensor can appropriately be carried out, and a deterioration of the catalytic converter can properly be judged on the basis of the target air-fuel ratio.

The feedback controlling process may be carried out with a known PID controller. Preferably, according to a fourth aspect, the step of feedback-controlling the air-fuel ratio of the mixture comprises the step of controlling the air-fuel ratio of the mixture based on an output signal from a recursive-type feedback controller for being supplied with the calculated target air-fuel ratio and the detected output signal from the air-fuel ratio sensor and calculating and outputting a control quantity to adjust the air-fuel ratio of the mixture so as to converge the detected output signal toward the target air-fuel ratio.

Use of the recursive-type feedback controller (specifically, an adaptive controller, for example) to feedback-controlling the air-fuel ratio of the mixture allows the air-fuel ratio of the exhaust gas actually supplied to the catalytic converter (the detected output signal from the air-fuel ratio sensor) to be controlled more accurately at the target air-fuel ratio for achieving the desired emission purifying capability of the catalytic converter than with the known PID controller, while reducing the effect of a change in the burned state of the mixture. As a result, the target air-fuel ratio can accurately be calculated on the basis of the detected output signal from the air-fuel ratio sensor which represents a result of purification of the exhaust gas by the catalytic converter. It is thus possible to increase the accuracy with which to judge a deterioration of the catalytic converter based on the target air-fuel ratio.

The recursive-type feedback controller serves to output a new control quantity according to predetermined recursive formulas including past time-series data of the control quantity for adjusting the air-fuel ratio of the mixture.

According to a fifth aspect, the method according to the first mode of the present invention is suitable if the catalytic converter comprises a catalytic converter disposed in an exhaust system of an internal combustion engine for burning the mixture therein. Since no special (dedicated) control process for controlling the air-fuel ratio of the mixture is not required for judging a deterioration of the catalytic converter in the first mode, it is possible to judge a deterioration of the catalytic converter in the exhaust system of the internal combustion engine while the internal combustion engine is in operation. If the air-fuel ratio of the mixture is controlled so as to equalize the air-fuel ratio of the exhaust gas actually supplied to the catalytic converter (the detected output signal from the air-fuel ratio sensor) with the target air-fuel ratio, then a deterioration of the catalytic converter can be judged while operating the internal combustion engine in order to allow the exhaust system to perform its desired emission function.

If the first mode of the invention is applied to the exhaust system of the internal combustion engine, and also the catalytic converter is installed in an exhaust system connected to cylinders of an internal combustion engine for burning the mixture in the cylinders, then the air-fuel ratio should preferably be controlled as follows:

According to a sixth aspect, in the first mode which does not necessarily have an air-fuel ratio sensor for detecting the air-fuel ratio of an exhaust gas supplied to the catalytic converter (the first and second aspects), the catalytic converter comprises a catalytic converter disposed in an exhaust system connected to cylinders of an internal combustion engine for burning the mixture in the cylinders, further comprising the steps of detecting the air-fuel ratio of the exhaust gas supplied to the catalytic converter with an air-fuel ratio sensor disposed upstream of the catalytic converter, and controlling the air-fuel ratio of the mixture in each of the cylinders to eliminate variations of the air-fuel ratio of the mixture in the cylinders.

According to a seventh aspect, in the first mode which necessarily has an air-fuel ratio sensor for detecting the air-fuel ratio of an exhaust gas supplied to the catalytic converter (the third and fourth aspects), the catalytic converter comprises a catalytic converter disposed in an exhaust system connected to cylinders of an internal combustion engine for burning the mixture in the cylinders, and wherein the step of controlling the air-fuel ratio of the mixture comprises the step of controlling the air-fuel ratio of the mixture in each of the cylinders to eliminate variations of the air-fuel ratio of the mixture in the cylinders based on the detected output signal from the air-fuel ratio sensor.

With the internal combustion engine having the plural cylinders, the air-fuel ratio of the mixture in each of the cylinders is controlled to eliminate variations of the air-fuel ratio of the mixture in the cylinders based on the detected output signal from the air-fuel ratio sensor upstream of the catalytic converter, stabilizing the air-fuel ratio of the exhaust gas supplied to the catalytic converter and hence stabilizing the detected output signal from the air-fuel ratio sensor. Therefore, the accuracy of calculation of the target air-fuel ratio based on the detected output signal from the air-fuel ratio sensor is increased, increasing the accuracy with which a deterioration of the catalytic converter is judged on the basis of the target air-fuel ratio.

For controlling the air-fuel ratio of the mixture in each of the cylinders to eliminate variations of the air-fuel ratio of the mixture in the cylinders, it is possible to model the internal combustion engine as a system for generating the detected output signal of the air-fuel ratio sensor from the actual air-fuel ratio of the mixture in each of the cylinders of the internal combustion engine, estimate the actual air-fuel ratio of the mixture in each of the cylinders from the detected output signal of the air-fuel ratio sensor based on the modeled system, and feedback-control the air-fuel ratio of the mixture in each of the cylinders so as to converge the estimated actual air-fuel ratio of the mixture in each of the cylinders toward a common target value.

According to an eighth aspect in the first mode, as described above, the step of judging a deteriorated state of the catalytic converter comprises the step of judging a deteriorated state of the catalytic converter based on a plurality of data of the target air-fuel ratio which are determined when the exhaust gas is supplied to the catalytic converter. Using the plurality of data of the target air-fuel ratio for judging a deteriorated state of the catalytic converter allows the catalytic converter to be judged for its deterioration with greater reliability than using single data of the target air-fuel ratio.

According to a ninth aspect, the step of judging a deteriorated state of the catalytic converter comprises the step of judging a deteriorated state of the catalytic converter by comparing, with predetermined reference data, at least one item of data of the target air-fuel ratio which is determined when the exhaust gas is supplied to the catalytic converter or data generated by processing the data of the target air-fuel ratio and representing a degree of deterioration of the catalytic converter. As described above, the value of the target air-fuel ratio, which is the air-fuel ratio of the exhaust gas to be supplied to the catalytic converter to achieve its desired emission purifying capability, or a rate of change of the target air-fuel ratio with respect to a change of an operating state of the catalytic converter, e.g., the amount of the exhaust gas flowing through the catalytic converter, depends on a degree of deterioration of the catalytic converter. Therefore, it is possible to judge a deteriorated state of the catalytic converter by comparing at least one item of data of the target air-fuel ratio or data (e.g., an average of plural data of the target air-fuel ratio or a rate of change of the target air-fuel ratio) generated therefrom and representing a degree of deterioration of the catalytic converter with predetermined reference data.

According to a tenth aspect, the reference data is preferably established depending on an operating state of the catalytic converter. Since the target air-fuel ratio, which is the air-fuel ratio of the exhaust gas to be supplied to the catalytic converter to achieve its desired emission purifying capability, is affected by an operating state of the catalytic converter such as the amount of the exhaust gas in the catalytic converter or an active state thereof, it is possible to judge a deteriorated state of the catalytic converter irrespective of the operating state of the catalytic converter by establishing the reference data, depending on the operating state of the catalytic converter, for comparison with at least one item of data of the target air-fuel ratio or data generated therefrom and representing a degree of deterioration of the catalytic converter with predetermined reference data.

A deteriorated state of the catalytic converter may specifically be judged as follows:

According to an eleventh aspect, the step of judging a deteriorated state of the catalytic converter comprises the step of judging a deteriorated state of the catalytic converter by comparing, with predetermined reference data, at least one item of data of the target air-fuel ratio which is determined when the exhaust gas is supplied to the catalytic converter, and determining whether the data of the target air-fuel ratio is on a leaner side or a richer side of the reference value.

Specifically, the value of the target air-fuel ratio represents a degree of deterioration of the catalytic converter, and is shifted toward the leaner side or the richer side (depending on the type of the fuel used) as the catalytic converter is deteriorated. It is possible to judge a deteriorated state of the catalytic converter by determining whether the data of the target air-fuel ratio is on the leaner side or the richer side of the reference value.

Since the value of the target air-fuel ratio is affected by the operating state of the catalytic converter (particularly, the amount of the exhaust gas flowing through the catalytic converter), the reference data is preferably established depending on an operating state of the catalytic converter, and depends on the operating state of the catalytic converter at the time the target air-fuel ratio is calculated, according to a twelfth aspect. In this manner, a deteriorated state of the catalytic converter can properly be judged regardless of a predetermined operating state of the catalytic converter.

Alternatively, according to a thirteenth aspect, the data of the target air-fuel ratio may comprise data of the target air-fuel ratio determined in the operating state of the catalytic converter. The reference value can thus be established easily because it may be determined so as to correspond to a given operating state of the catalytic converter.

According to a fourteenth aspect, the step of judging a deteriorated state of the catalytic converter comprises the step of judging a deteriorated state of the catalytic converter by generating an average value of a plurality of data of the target air-fuel ratio which is determined when the exhaust gas is supplied to the catalytic converter, as data representing a degree of deterioration of the catalytic converter, and comparing the data representing a degree of deterioration of the catalytic converter with a predetermined reference value.

Inasmuch as the value of the target air-fuel ratio depends on a degree of deterioration of the catalytic converter, an average value of plural data of the target air-fuel ratio also represents a degree of deterioration of the catalytic converter (the average value is basically shifted toward the leaner side or the richer side as the catalytic converter is deteriorated). Therefore, it is possible to judge a deteriorated state of the catalytic converter by comparing a degree of deterioration of the catalytic converter represented by the average value with the reference value. Because an average value of plural data of the target air-fuel ratio is used to judge a deteriorated state of the catalytic converter, a deteriorated state of the catalytic converter can be judged highly reliably without suffering from a temporary change (noise-induced change) of the target air-fu ratio.

The plurality of data of the target air-fuel ratio may be determined at an arbitrary operating state of the catalytic converter. According to a fifth aspect, however, the plurality of data of the target air-fuel ratio comprise data of the target air-fuel ratio determined in a predetermined operating state of the catalytic converter. The accuracy with which to judge a deteriorated state of the catalytic converter can be increased while eliminating the effect which the operating state of the catalytic converter has on the target air-fuel ratio.

According to a sixteenth aspect, the step of judging a deteriorated state of the catalytic converter comprises the step of judging a deteriorated state of the catalytic converter by generating a correlation between the target air-fuel ratio and operating states of the catalytic converter from a plurality of data of the target air-fuel ratio which are determined in the operating states of the catalytic converter when the exhaust gas is supplied to the catalytic converter, as data representing a degree of deterioration of the catalytic converter, and comparing the correlation with a predetermined reference characteristic depending on the operating states of the catalytic converter.

Since the target air-fuel ratio in each of the operating states of the catalytic converter is shifted toward the leaner side or the richer side as the catalytic converter is deteriorated, the correlation between the target air-fuel ratio produced from plural data determined in the operating stages of the catalytic converter and operating states of the catalytic converter also varies as the catalytic converter is deteriorated (see FIG. 4, for example). Therefore, a deterioration of the catalytic converter can be judged by comparing the correlation with the reference characteristic depending on the operating states of the catalytic converter. Because the correlation between the target air-fuel ratio produced from plural data thereof and the operating states of the catalytic converter is used, a deterioration of the catalytic converter can be judged highly accurately in view of the effect which the operating states of the catalytic converter have on the target air-fuel ratio while eliminating noise-induced variations of the individual data of the target air-fuel ratio.

The correlation may be generated from the plural data of the target air-fuel ratio according to various analytical processes. According to a seventeenth aspect, preferably, the correlation is determined from the plurality of data of the target air-fuel ratio according to a method of least squares or a successive method of least squares.

With the method of least squares or the successive method of least squares, the correlation suitable for use in judging a deterioration of the catalytic converter can be produced. If the successive method of least squares is employed, each of the data of the target air-fuel ratio can be obtained and the correlation can also be produced concurrently. Therefore, the correlation can be determining without use of a large-capacity memory for storing a large amount of data.

According to an eighteenth aspect, the step of judging a deteriorated state of the catalytic converter comprises the step of judging a deteriorated state of the catalytic converter by generating a rate of change of the target air-fuel ratio with respect to a change in operating states of the catalytic converter from a plurality of data of the target air-fuel ratio which are determined in the operating states of the catalytic converter when the exhaust gas is supplied to the catalytic converter, as data representing a degree of deterioration of the catalytic converter, and comparing the data representing a degree of deterioration of the catalytic converter with a predetermined reference value.

Specifically, as described above with reference to FIG. 4, a rate of change of the target air-fuel ratio with respect to a change in the operating states of the target air-fuel ratio varies as the catalytic converter is deteriorated. For example, a rate of change of the target air-fuel ratio with respect to a change in the amount of the exhaust gas flowing through the catalytic converter is progressively reduced as the catalytic converter is deteriorated. Therefore, a deteriorated state of the catalytic converter can be judged by comparing the rate of change with the reference value.

If the operating states of the catalytic converter are taken into account in judging a deteriorated state of the catalytic converter based on the target air-fuel ratio, then the operating states of the catalytic converter include at least the amount of the exhaust gas flowing through the catalytic converter, according to a nineteenth aspect. This is because the amount of the exhaust gas flowing through the catalytic converter has a largest effect, among the operating states of the catalytic converter, on the target air-fuel ratio.

For taking into account the operating states of the catalytic converter in judging a deteriorated state of the catalytic converter, it is necessary to recognize the operating states of the catalytic converter (the amount of the exhaust gas flowing through the catalytic converter and the active state of the catalytic converter). The amount of the exhaust gas flowing through the catalytic converter can be detected by a flow rate sensor disposed in an exhaust gas passage which is equipped with the catalytic converter. If the catalytic converter is installed in an exhaust system of an internal combustion engine, then the amount of the exhaust gas flowing through the catalytic converter may be recognized from an amount of supplied fuel, which corresponds to the amount of the exhaust gas discharged from the internal combustion engine, or an operating condition of the internal combustion engine, such as an amount of intake air or the like. Furthermore, the amount of the exhaust gas flowing through the catalytic converter may be recognized from other operating conditions of the internal combustion engine, such as an engine temperature or a period of time that has elapsed after the internal combustion engine has started to operate.

According to the second aspect in the first mode, for controlling the air-fuel ratio of the mixture so as to equalize the air-fuel ratio of the exhaust gas supplied to the catalytic converter with the target air-fuel ratio, the air-fuel ratio of the exhaust gas actually supplied to the catalytic converter is basically in conformity with the target air-fuel ratio. Therefore, if the air-fuel ratio of the exhaust gas supplied to the catalytic converter is detected by an air-fuel ratio sensor disposed upstream of the catalytic converter, then a detected output signal from the air-fuel sensor corresponds to the target air-fuel ratio. As a consequence, it is possible to judge a deteriorated state of the catalytic converter by using a detected output signal from the air-fuel sensor instead of the target air-fuel ratio in the first mode.

According to a second mode of the present invention, there is provided in accordance with a twentieth aspect a method of judging a deterioration of a catalytic converter for purifying an exhaust gas produced by burning a mixture of a fuel and air, comprising the steps of supplying the exhaust gas to the catalytic converter, detecting the amount of a predetermined component of the exhaust gas which has passed through the catalytic converter with an exhaust gas sensor disposed downstream of the catalytic converter, calculating a target air-fuel ratio for the exhaust gas to be supplied to the catalytic converter for achieving a predetermined emission purifying capability of the catalytic converter based on a detected output signal from the exhaust gas sensor, controlling the air-fuel ratio of the mixture so as to equalize the air-fuel ratio of the exhaust gas supplied to the catalytic converter with the target air-fuel ratio, detecting the air-fuel ratio of the exhaust gas supplied to the catalytic converter while the air-fuel ratio of the mixture is being controlled, with an air-fuel ratio sensor disposed upstream of the catalytic converter, and judging a deteriorated state of the catalytic converter based on a detected output signal from the air-fuel ratio sensor.

In the second mode, the target air-fuel ratio determined when the exhaust gas is supplied to the catalytic converter is the air-fuel ratio (corresponding to the purification-optimizing air-fuel ratio) of the exhaust gas upstream of the catalytic converter to enable the catalytic converter to achieve its desired emission purifying capability (e.g., maximum emission purifying capability). Therefore, by controlling the air-fuel ratio of the mixture so as to equalize the air-fuel ratio of the exhaust gas upstream of the catalytic converter with the target air-fuel ratio, the value of the detected output signal from the air-fuel ratio sensor (the detected air-fuel ratio of the exhaust gas actually supplied to the catalytic converter) or a rate of change of the detected output signal with respect to a change in an operating state of the catalytic converter depends on a degree of deterioration of the catalytic converter. Consequently, a deteriorated state of the catalytic converter can be judged on the basis of the data of the detected output signal from the air-fuel ratio sensor. Because the air-fuel ratio of the exhaust gas actually supplied to the catalytic converter is controlled at the target air-fuel ratio which is the air-fuel ratio of the exhaust gas to be supplied to the catalytic converter to achieve its desired emission purifying capability, it is possible to judge a deterioration of the catalytic converter while supplying the exhaust gas to the catalytic converter in order to maintain the desired emission purifying capability of the catalytic converter.

According to the second mode, therefore, a deterioration of the catalytic converter can be judged while maintaining the desired emission purifying capability of the catalytic converter without effecting a special control process (which tends to sacrifice the emission purifying capability of the catalytic converter) for controlling the air-fuel ratio of the mixture to generate the exhaust gas supplied to the catalytic converter.

The second mode of the present invention should preferably incorporate arrangements which are the same as those according to the third through nineteenth aspects of the first mode.

Specifically, the step of controlling the air-fuel ratio of the mixture preferably comprises the step of feedback-controlling the air-fuel ratio of the mixture so as to converge the detected output signal from the air-fuel ratio sensor toward the target air-fuel ratio, according to a twenty-first aspect which corresponds to the third aspect.

The step of feedback-controlling the air-fuel ratio of the mixture preferably comprises the step of controlling the air-fuel ratio of the mixture based on an output signal from a recursive-type feedback controller for being supplied with the calculated target air-fuel ratio and the detected output signal from the air-fuel ratio sensor and calculating and outputting a control quantity to adjust the air-fuel ratio of the mixture so as to converge the detected output signal toward the target air-fuel ratio, according to a twenty-second aspect which corresponds to the fourth aspect.

The catalytic converter preferably comprises a catalytic converter disposed in an exhaust system of an internal combustion engine for burning the mixture therein, according to a twenty-third aspect which corresponds to the fifth aspect.

The catalytic converter preferably comprises a catalytic converter disposed in an exhaust system connected to cylinders of an internal combustion engine for burning the mixture in the cylinders, and wherein the step of controlling the air-fuel ratio of the mixture comprises the step of controlling the air-fuel ratio of the mixture in each of the cylinders to eliminate variations of the air-fuel ratio of the mixture in the cylinders based on the detected output signal from the air-fuel ratio sensor, according to a twenty-fourth aspect which corresponds to the sixth and seventh aspects.

The step of judging a deteriorated state of the catalytic converter preferably comprises the step of judging a deteriorated state of the catalytic converter based on a plurality of data of the target air-fuel ratio which are determined when the exhaust gas is supplied to the catalytic converter, according to a twenty-fifth aspect which corresponds to the eighth aspect.

The step of judging a deteriorated state of the catalytic converter preferably comprises the step of judging a deteriorated state of the catalytic converter by comparing, with predetermined reference data, at least one item of data of the detected output signal from the air-fuel ratio sensor which is produced when the exhaust gas is supplied to the catalytic converter or data generated by processing the data of the detected output signal and representing a degree of deterioration of the catalytic converter, according to a twenty-sixth aspect which corresponds to the ninth aspect.

The reference data is preferably established depending on an operating state of the catalytic converter, according to a twenty-seventh aspect which corresponds to the tenth aspect.

The step of judging a deteriorated state of the catalytic converter comprises the step of judging a deteriorated state of the catalytic converter by comparing, with predetermined reference data, at least one item of data of the detected output signal from the air-fuel ratio sensor which is produced when the exhaust gas is supplied to the catalytic converter, and determining whether the data of the detected output signal is on a leaner side or a richer side of the reference value, according to a twenty-eighth aspect which corresponds to the eleventh aspect.

The reference data is preferably established depending on an operating state of the catalytic converter, and depends on the operating state of the catalytic converter at the time the target air-fuel ratio is calculated, according to a twenty-ninth aspect which corresponds to the twelfth aspect.

Alternatively, the data of the detected output signal may comprise data of the target air-fuel ratio determined in a predetermined operating state of the catalytic converter, according to a thirtieth aspect which corresponds to the thirteenth aspect.

The step of judging a deteriorated state of the catalytic converter comprises the step of judging a deteriorated state of the catalytic converter by generating an average value of a plurality of data of the detected output signal from the air-fuel ratio sensor which are determined when the exhaust gas is supplied to the catalytic converter, as data representing a degree of deterioration of the catalytic converter, and comparing the data representing a degree of deterioration of the catalytic converter with a predetermined reference value, according to a thirty-first aspect which corresponds to the fourteenth aspect.

The plurality of data of the detected output signal from the air-fuel ratio sensor preferably comprise data produced by the air-fuel ratio sensor in a predetermined operating state of the catalytic converter, according to a thirty-second aspect which corresponds to the fifteenth aspect.

The step of judging a deteriorated state of the catalytic converter comprises the step of judging a deteriorated state of the catalytic converter by generating a correlation between the detected output signal from the air-fuel ratio sensor and operating states of the catalytic converter from a plurality of data of the detected output signal from the air-fuel ratio sensor which are determined in the operating states of the catalytic converter when the exhaust gas is supplied to the catalytic converter, as data representing a degree of deterioration of the catalytic converter, and comparing the correlation with a predetermined reference characteristic depending on the operating states of the catalytic converter, according to a thirty-third aspect which corresponds to the sixteenth aspect.

The correlation is preferably determined from the plurality of data of the detected output signal from the air-fuel ratio sensor according to a method of least squares or a successive method of least squares, according to a thirty-fourth aspect which corresponds to the seventeenth aspect.

The step of judging a deteriorated state of the catalytic converter comprises the step of judging a deteriorated state of the catalytic converter by generating a rate of change of the detected output signal from the air-fuel ratio sensor with respect to a change in operating states of the catalytic converter from a plurality of data of the detected output signal from the air-fuel ratio sensor which are determined in the operating states of the catalytic converter when the exhaust gas is supplied to the catalytic converter, as data representing a degree of deterioration of the catalytic converter, and comparing the data representing a degree of deterioration of the catalytic converter with a predetermined reference value, according to a thirty-fifth aspect which corresponds to the eighteenth aspect.

The operating states of the catalytic converter include at least the amount of the exhaust gas flowing through the catalytic converter, according to a thirty-sixth aspect which corresponds to the nineteenth aspect.

The arrangements according to the twenty-first through thirty-sixth aspects in the second mode offer the same advantages as those of the arrangements according to the third through nineteenth aspects in the first mode.

In the first and second modes, the step of calculating a target air-fuel ratio comprises the step of determining the target air-fuel ratio such that the detected output signal from the exhaust gas sensor will be of a predetermined value, according to a thirty-seventh aspect. The target air-fuel ratio is thus determined as the air-fuel ratio of the exhaust gas supplied to the catalytic converter for achieving an optimum emission purifying capability of the catalytic converter.

More preferably, the exhaust gas sensor comprises an oxygen concentration sensor for detecting the concentration of oxygen in the exhaust gas which has passed through the catalytic converter, as the predetermined component of the exhaust gas, and the predetermined value comprises a constant value, according to a thirty-eighth aspect.

With the emission purifying capability of the catalytic converter being maximum, the concentration of oxygen contained in the exhaust gas having passed through the catalytic converter is of a substantially constant value regardless of the deterioration of the catalytic converter. Therefore, if an oxygen concentration sensor is used as the exhaust gas sensor and the target air-fuel ratio is determined such that a detected output signal from the oxygen concentration sensor will be of a constant value, then the target air-fuel ratio is determined as the air-fuel ratio of the exhaust gas supplied to the catalytic converter for achieving an optimum emission purifying capability of the catalytic converter regardless of the deterioration of the catalytic converter. In the second mode or according to the second through fourth aspects in the first mode in which the air-fuel ratio of the mixture is controlled to equalize the air-fuel ratio of the exhaust gas supplied to the catalytic converter with the target air-fuel ratio, it is possible to judge a deterioration of the catalytic converter while maintaining an optimum emission purifying capability of the catalytic converter regardless of the deterioration of the catalytic converter. In addition, the target air-fuel ratio can be determined stably by using a constant target value for the detected output signal from the exhaust gas sensor (oxygen concentration sensor). In the first mode which judges a deterioration of the catalytic converter based on the target air-fuel ratio, a deterioration of the catalytic converter can be judged stably with accuracy. In the second mode, since the air-fuel ratio of the exhaust gas supplied to the catalytic converter (the detected output signal from the air-fuel ratio sensor) is controlled at the target air-fuel ratio which is stably determined, the detected output signal from the air-fuel ratio sensor is stabilized, and hence a deterioration of the catalytic converter can be judged stably with accuracy based on the detected output signal from the air-fuel ratio sensor.

If the target air-fuel ratio is determined such that the detected output signal from the air-fuel ratio sensor will be of a predetermined appropriate value, the step of calculating a target air-fuel ratio preferably comprises the step of determining a target air-fuel ratio based on an output signal from a sliding mode controller for being supplied with the detected air-fuel ratio from the exhaust gas sensor and calculating and outputting a control quantity to adjust the air-fuel ratio of the exhaust gas to be supplied to the catalytic converter so as to converge the detected output signal toward the predetermined value, according to a thirty-ninth aspect.

Specifically, a sliding mode controller generally has such an excellent property that it is less susceptible to disturbance and changes in the characteristics of an object to be controlled than the known PID controllers. If such a sliding mode controller is used to calculate a control quantity to adjust the air-fuel ratio of the exhaust gas to be supplied to the catalytic converter so as to converge the detected output signal from the exhaust gas sensor toward the predetermined value, and the target air-fuel ratio is determined depending on the control quantity, then it is possible to determine highly accurately and stably the target air-fuel ratio which is the air-fuel ratio of the exhaust gas to be supplied to the catalytic converter so as to converge the detected output signal from the exhaust gas sensor toward the predetermined value. According to the first mode, therefore, the accuracy with which to judge a deterioration of the catalytic converter based on the target air-fuel ratio can further be increased. According to the second mode, since the air-fuel ratio of the exhaust gas supplied to the catalytic converter (the detected output signal from the air-fuel ratio sensor) is controlled at the target air-fuel ratio which is highly accurately determined, the accuracy with which to judge a deterioration of the catalytic converter based on the detected output signal from the air-fuel ratio sensor can further be increased.

In the first and second modes, the method may further comprise the step of generating an alarm when the catalytic converter is judged as being in a deteriorated state, according to a fortieth aspect.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

A first embodiment of the present invention will first be described below with reference to FIGS. 5 through 10. A catalytic converter whose deteriorated state will be judged according to the first embodiment of the present invention is installed in an exhaust system of an internal combustion engine. Similarly, a catalytic converter whose deteriorated state will be judged according to second and third embodiments of the present invention is installed in an exhaust system of an internal combustion engine.

An air-fuel ratio control system for an internal combustion engine, which is employed to judge a deterioration of the catalytic converter, will be described below.

Figure 5:
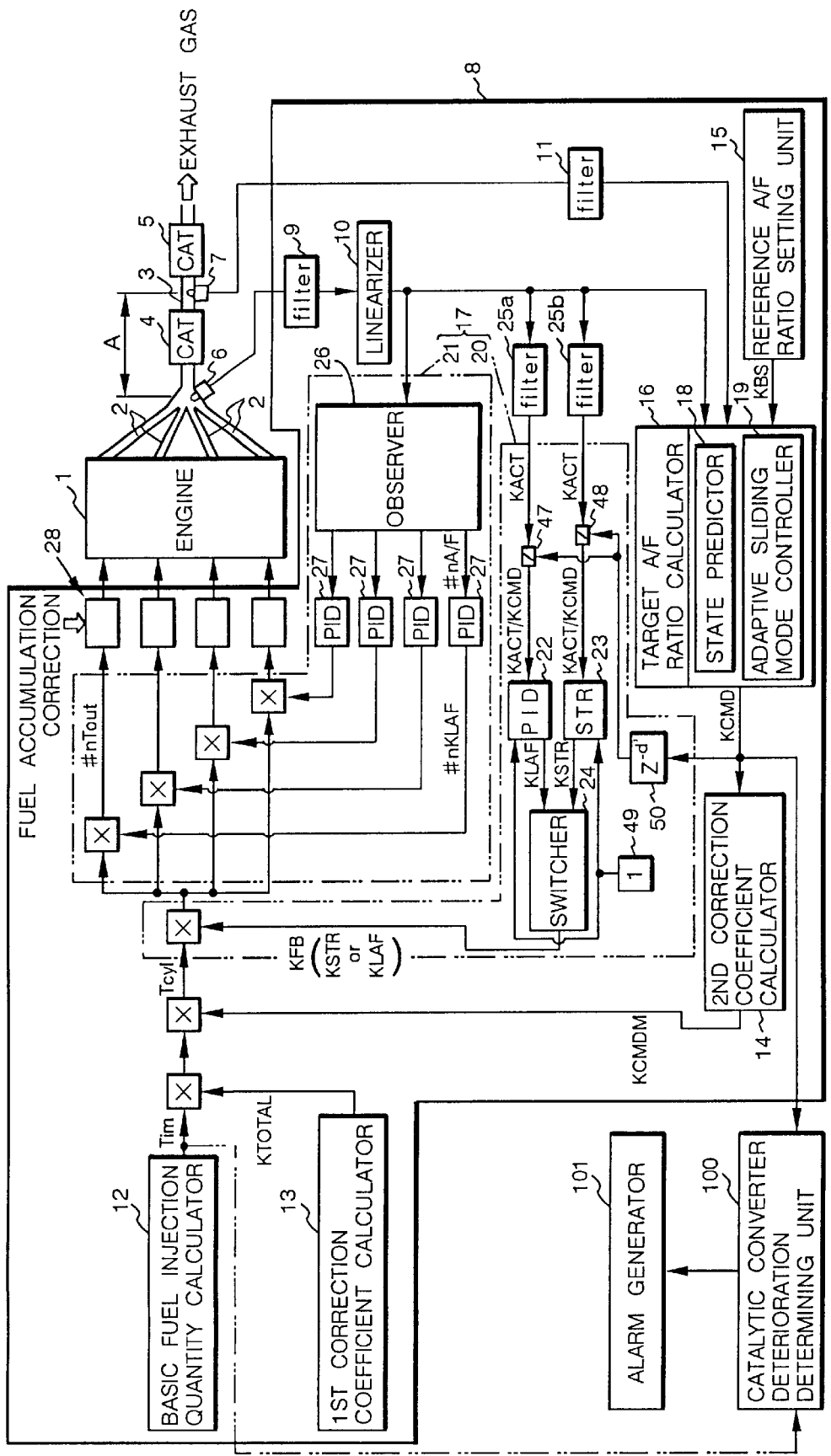
FIG. 5 is a block diagram of an air-fuel ratio control system for an internal combustion engine which is used with respect to the present invention.

FIG. 5 shows in block form the air-fuel ratio control system. As shown in FIG. 5, an internal combustion engine 1 such as a four-cylinder internal combustion engine for burning a mixture of air and a fuel (gasoline in the embodiment) includes exhaust pipes 2 extending from the respective cylinders and joined together to a single main exhaust pipe 3 near the cylinder block. Two three-way catalytic converters 4, 5 are mounted in the main exhaust pipe 3 at successively downstream locations thereon. The upstream catalytic converter 4 is to be judged for its deterioration according to the present invention. The downstream catalytic converter 5 may be dispensed with.

The air-fuel control system combined with the internal combustion engine 1 comprises a wide-range air-fuel ratio sensor 6 mounted on the junction of the exhaust pipes 2 upstream of the catalytic converter 4, an $O_2$ sensor (oxygen concentration sensor) 7 mounted as an exhaust gas sensor on the main exhaust pipe 3 downstream of the catalytic converter 4 and upstream of the catalytic converter 5, and a control unit 8 for carrying out a control process (described later on) and judging a deterioration of the catalytic converter 4 based on detected output signals from the sensors 6, 7. The control unit 8 is supplied with detected output signals from the sensors 6, 7 and also detected output signals from various other sensors including a engine speed sensor, an intake pressure sensor, a coolant temperature sensor, etc.

The wide-range air-fuel ratio sensor 6 is in the form of an $O_2$ sensor, and outputs a signal having a level depending on the air-fuel ratio of an exhaust gas in the junction of the exhaust pipes 2 upstream of the catalytic converter 4, the air-fuel ratio being commensurate with the air-fuel ratio of an air-fuel mixture that is supplied to and burned in the internal combustion engine 1. The output signal from the wide-range air-fuel ratio sensor 6 passes through a filter 9 in the control unit 8 which removes high-frequency noises from the output signal, and then is converted by a linearizer 10 in the control unit 8 into a signal having a level which is proportional to the air-fuel ratio of an exhaust gas in a wide range of air-fuel ratios. The wide-range air-fuel ratio sensor 6 whose output signal will thus be linearized will hereinafter be referred to as an LAF sensor 6. The air-fuel ratio, detected by the LAF sensor 6, of the exhaust gas (supplied from the engine 1 to the catalytic converter 4) upstream of the catalytic converter 4 will hereinafter be referred to as "pre-CAT A/F".

Figure 1:
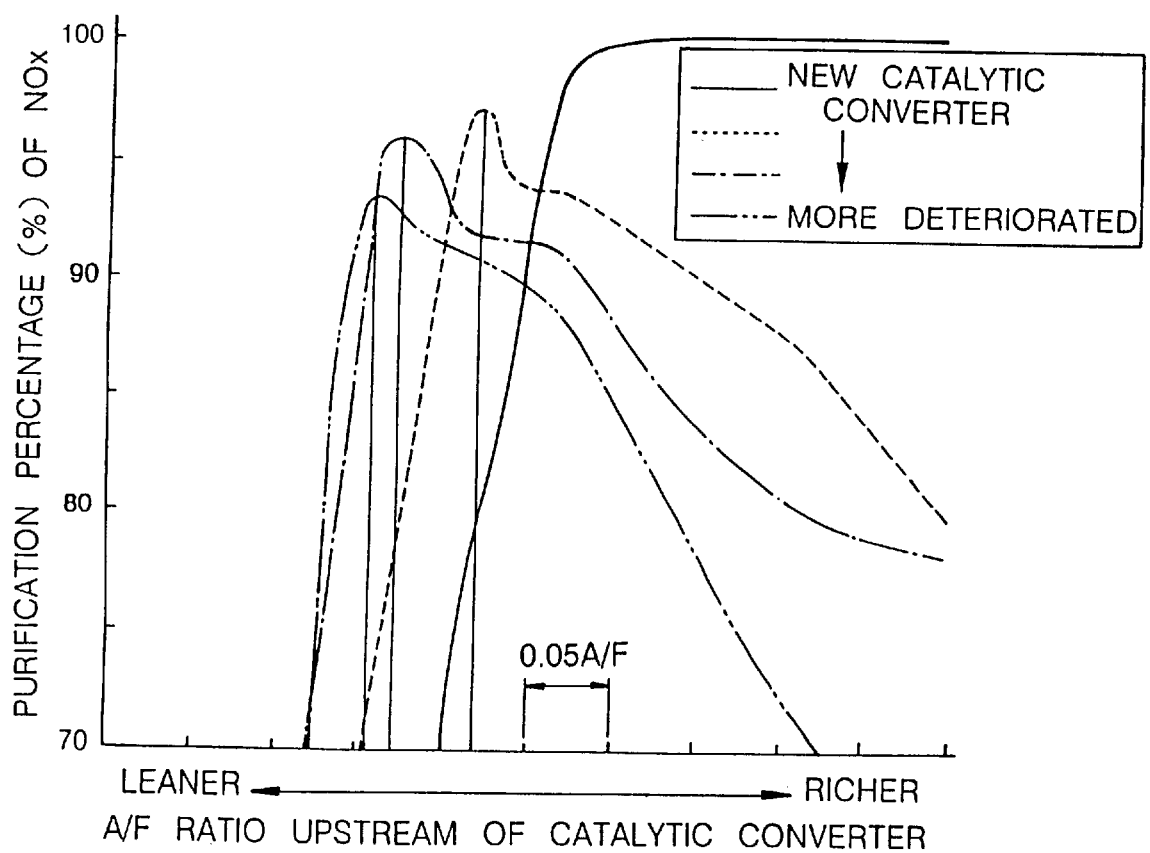
FIG. 1 is a diagram illustrative of the principles of a method of judging a deterioration of a catalytic converter according to the present invention.
Figure 2:
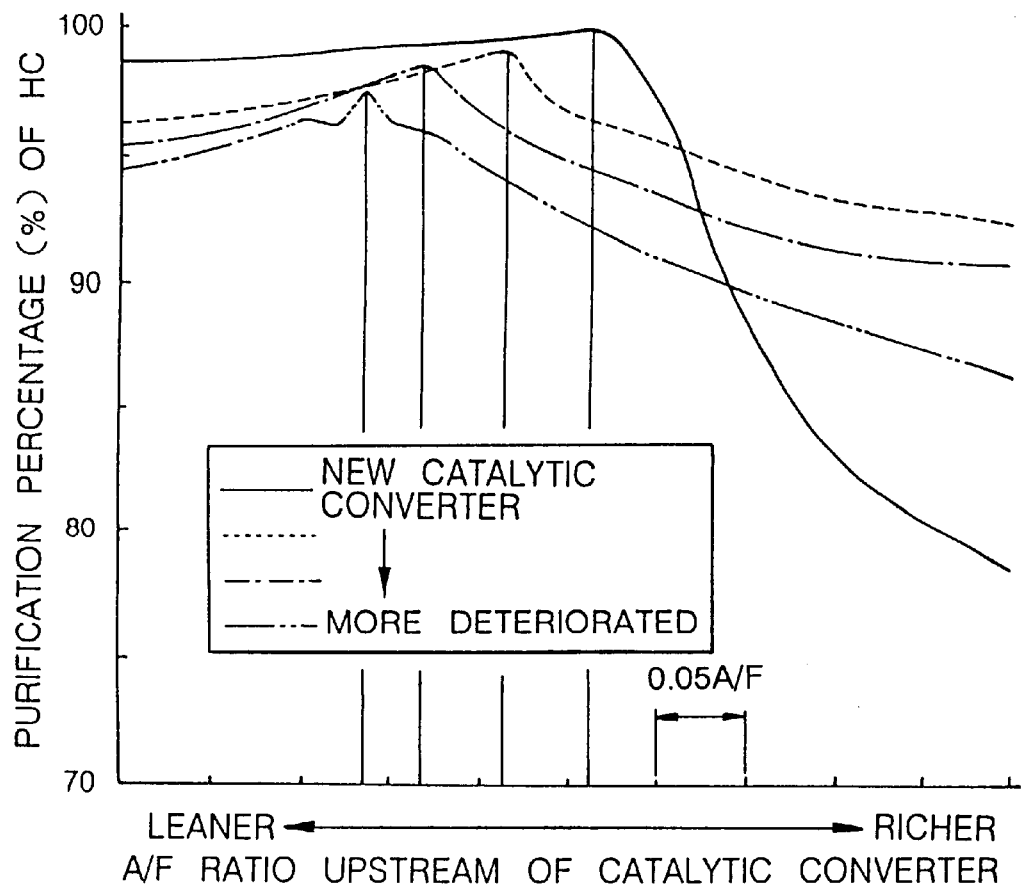
FIG. 2 is a diagram illustrative of the principles of the method of judging a deterioration of a catalytic converter according to the present invention.
Figure 3:
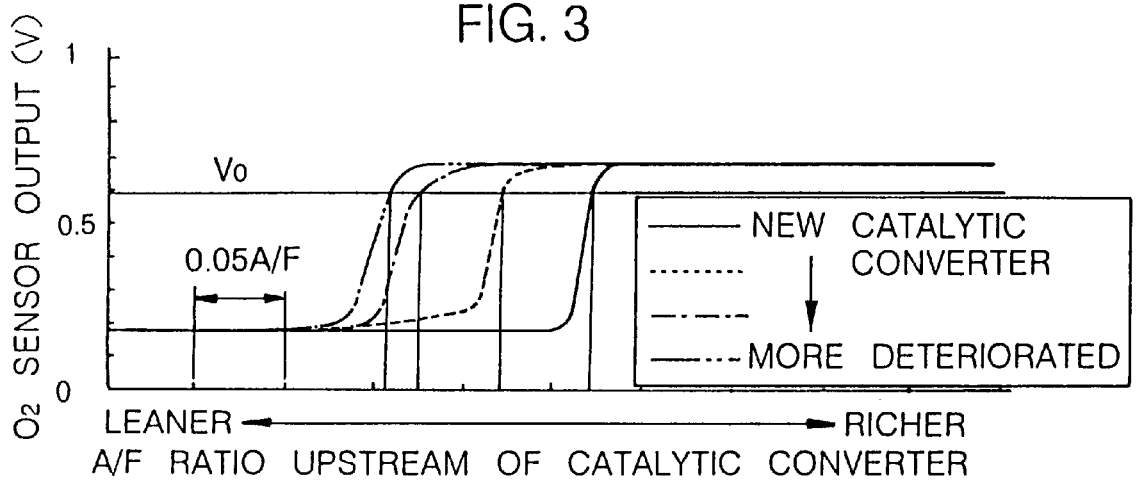
FIG. 3 is a diagram illustrative of the principles of the method of judging a deterioration of a catalytic converter according to the present invention.

The $O_2$ sensor 7 disposed downstream of the catalytic converter 4 outputs a signal having a level depending on the oxygen concentration (which is commensurate with the air-fuel ratio of the exhaust gas downstream of the catalytic converter 4) of the exhaust gas that has passed through the catalytic converter 4. The output signal from the $O_2$ sensor 7 has characteristics as shown in FIG. 3, is substantially proportional with high sensitivity to the oxygen concentration of the exhaust gas that has passed through the catalytic converter 4, with the air-fuel ratio of the air-fuel mixture supplied to the catalytic converter 4 being of a value close to an air-fuel ratio for enabling the catalytic converter 4 to exhibit a maximum emission purifying capability. High-frequency noises are removed from the output signal of the $O_2$ sensor 7 by a filter 11 in the control unit 8.

The control unit 8 comprises a microcomputer and has, as its main functions for controlling the air-fuel ratio of an air-fuel mixture to be burned in the internal combustion engine 1, a basic fuel injection quantity calculator 12 for determining a basic fuel injection quantity Tim to be injected into the internal combustion engine 1, a first correction coefficient calculator 13 for determining a first correction coefficient KTOTAL to correct the basic fuel injection quantity Tim in view of an exhaust recirculation ratio (the proportion of the exhaust gas contained in intake air of the internal combustion engine 1) of the internal combustion engine 1, a purged quantity of fuel supplied to the internal combustion engine 1 when a canister (not shown) thereof is purged, the coolant temperature and intake temperature of the internal combustion engine 1, etc., a second correction coefficient calculator 14 for determining a second correction coefficient KCMDM to correct the basic fuel injection quantity Tim in view of the charging efficiency of intake air corresponding to a target air-fuel ratio (a target air-fuel ratio for the exhaust gas supplied to the catalytic converter 4) from the target air-fuel ratio at the LAF sensor 6, a basic air-fuel ratio setting unit 15 for establishing a basic air-fuel ratio KBS (a basic air-fuel ratio of the exhaust gas at the LAF sensor 6) of the internal combustion engine 1, a target air-fuel ratio calculator 16 for correcting the basic air-fuel ratio KBS based on the output signal from the $O_2$ sensor 7 thereby to determine a target air-fuel ratio KCMD at the LAF sensor 6, and a feedback controller 17 for feedback-controlling a fuel injection quantity (fuel supply quantity) of the internal combustion engine 1 based on the output signal from the LAF sensor 6 so as to converge the pre-CAT A/F detected by the LAF sensor 6 toward the target air-fuel ratio KCMD.

The basic fuel injection quantity calculator 12 determines a reference fuel injection quantity from the rotational speed and intake pressure of the internal combustion engine 1 using a predetermined map, and corrects the determined reference fuel injection quantity depending on the effective opening area of a throttle valve (not shown) of the internal combustion engine 1, thereby calculating a basic fuel injection quantity Tim.

Specific methods of calculating the basic fuel injection quantity Tim, the first correction coefficient KTOTAL, and the second correction coefficient KCMDM are disclosed in Japanese laid-open patent publication No. 5-79374 which corresponds to U.S. Pat. No. 5,253,630, and will not be described in detail below. The basic fuel injection quantity Tim is corrected by being multiplied by the first correction coefficient KTOTAL and the second correction coefficient KCMDM, producing a demand fuel injection quantity Tcyl.

The basic air-fuel ratio setting unit 15 determines a basic air-fuel ratio KBS from the rotational speed and intake pressure of the internal combustion engine 1 using a predetermined map.

The target air-fuel ratio calculator 16 comprises a state predictor 18 for estimating state quantities (specifically, the value of the post-CAT A/F and a changing degree such as a change or rate of change of the post-CAT A/F) of the post-CAT A/F detected by the $O_2$ sensor 7 in view of a dead time present in an exhaust system A which extends from the LAF sensor 6 to the $O_2$ sensor 7 and includes the catalytic converter 4, after elapse of the dead time from the present time, and an adaptive sliding mode controller 19 (sliding mode controller) for determining a correction quantity (an adjustment quantity for the air-fuel ratio of the exhaust gas supplied to the catalytic converter 4) for the basic air-fuel ratio KBS to define the target air-fuel ratio KCMD for converging the output signal from the $O_2$ sensor 7 toward a predetermined appropriate value based on the state quantities estimated by the state predictor 18 according to an adaptive sliding mode control process which takes into account disturbance such as noise. The target air-fuel ratio calculator 16 calculates the target air-fuel ratio KCMD by correcting the basic air-fuel ratio KBS with the correction quantity determined by the adaptive sliding mode controller 19, i.e., adding the correction quantity to the basic air-fuel ratio KBS.

Details of the state predictor 18 and the adaptive sliding mode controller 19 are disclosed in Japanese patent application No. 8-84047 (corresponding to U.S. Pat. application Ser. No. 08/833091), and will not be described below. However, a summary of the state predictor 18 and the adaptive sliding mode controller 19 will be given below.

For determining a target air-fuel ratio KCMD according to an adaptive sliding mode control process (described later on), in order to compensate for the dead time d in the exhaust system A, the state predictor 18 estimates a state quantity of the post-CAT A/F after the dead time, using the pre-CAT A/F detected by the LAF sensor 6 and the post-CAT A/F detected by the $O_2$ sensor 7.

Figure 6:
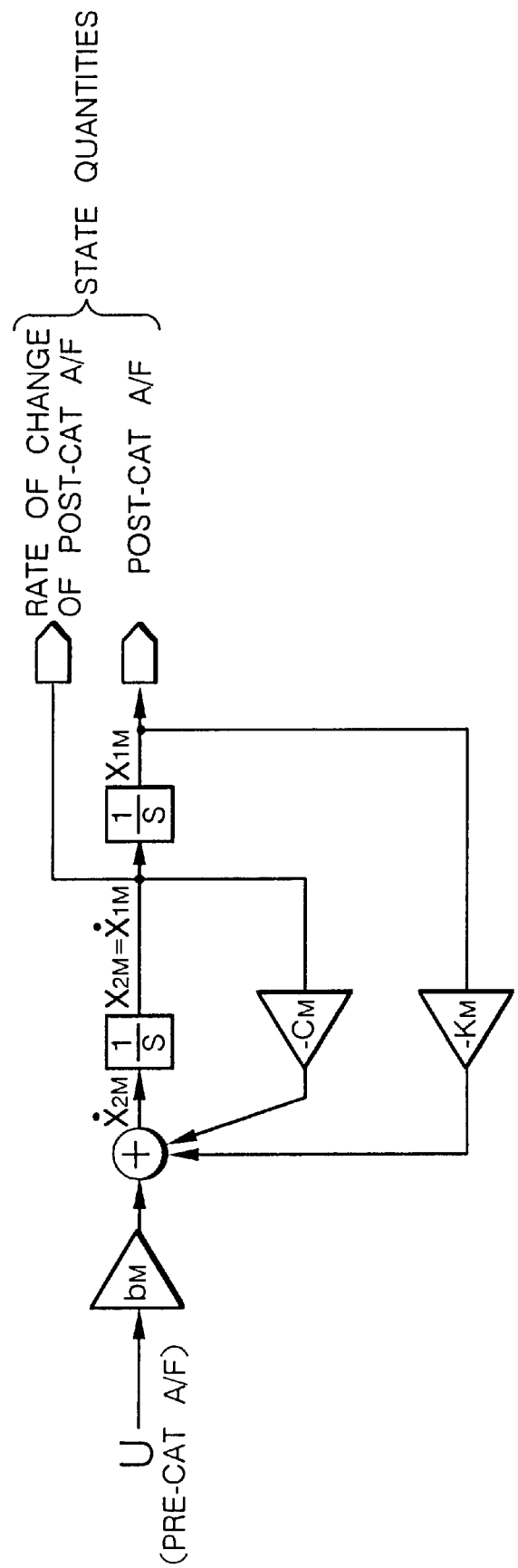
FIG. 6 is a block diagram of a model used in the air-fuel ratio control system shown in FIG. 5.

The exhaust system A is modeled with a system having a time lag of second order, as shown in FIG. 6, for example, i.e., a system having a time lag of second order which is supplied with the pre-CAT A/F as an input U and which outputs a value $x_{1M}$ of the post-CAT A/F and its rate of change $x_{2M}=dx_{1M}/dt$. The state predictor 18 solves state equations (1), given below, represented by the model system in a time series to determine the state quantities $x_{1M}$, $x_{2M}$ of the post-CAT A/F on the model.

$$\begin{cases} \dot{x}_{1M} = x_{2M} \\ \dot{x}_{2M} = -C_M \cdot x_{2M} - K_M \cdot x_{1M} + b_M \cdot U(t) \end{cases} \quad (1)$$

where $$\dot{x}_{1M} = \frac{dX_{1M}}{dt}, \dot{x}_{2M} = \frac{dX_{2M}}{dt}$$

In FIG. 6 and the equations (1), $C_M$, $K_M$, $b_M$ represent preset values established in molding the exhaust system A and "s" indicates a Laplace operator. In solving the equations (1), a value of the pre-CAT A/F actually detected by the LAF sensor 6 (actually, the output level of the LAF sensor 6), or a value produced by filtering or scaling the detected value is used as the input U(t).

Furthermore, the state predictor 18 determines estimated values $x_1$ hat (=an estimated value of the post-CAT A/F), $x_2$ hat (=an estimated value of a rate of change of the post-CAT A/F) of the post-CAT A/F after the dead time d, using time-series data of the determined state quantities $x_1$ M, $x_2$ of the post-CAT A/F on the model, a value $x_1$ of the post-CAT A/F actually detected from the output signal of the $O_2$ sensor at the present time t, and a rate of change $x_2=dx_1/dt$ (a rate of change of the output level of the $O_2$ sensor), on the assumption that the pre-CAT A/F (=U(t)) actually detected by the LAF sensor 6 is inputted to the model shown in FIG. 6 after the dead time in the exhaust system A, according to the following equation (2):

$$\begin{bmatrix} \hat{x}_1(t+d) \\ \hat{x}_2(t+d) \end{bmatrix} = e^{A \cdot dM} \cdot \begin{bmatrix} x_1(t) \\ x_2(t) \end{bmatrix} + \begin{bmatrix} x_{1M}(t) \\ x_{2M}(t) \end{bmatrix} - e^{A \cdot dM} \cdot \begin{bmatrix} x_{1M}(t-d_M) \\ x_{2M}(t-d_M) \end{bmatrix} \quad (2)$$

where "$e^{At}$" represents a matrix exponential function obtained when the state equations (2) are solved, and "$d_M$" a preset value (identified value) of the dead time d in the exhaust system A.

The estimated values $x_1$ hat, $x_2$ hat of the state quantities of the post-CAT A/F) which are determined according to the equations (2) will hereinafter be referred to as estimated state quantities.

The adaptive sliding mode controller 19 uses a process called an adaptive sliding mode control process as disclosed in, for example, "Sliding mode control—design theory of nonlinear robust control—", pages 134~135, published Oct. 20, 1994 by Corona Co., Ltd. to calculate a correction quantity for the basic air-fuel ratio KBS to define the target air-fuel ratio KCMD for adjusting the postCAT A/F to a predetermined value corresponding to the output level V0 of the $O_2$ sensor 7 shown in FIG. 3 while eliminating the effect of disturbance or the like as much as possible.

In order to adjust the post-CAT A/F to a predetermined value (denoted by "q") corresponding to the output level V0 of the $O_2$ sensor 7 shown in FIG. 3, the adaptive sliding mode controller 19 sets target values for the estimated state quantities $x_1$ hat, $x_2$ hat of the post-CAT A/F which are determined by the state predictor 18 respectively to "q" and "0", and establishes a hyperplane σ=0 for carrying out the adaptive sliding mode control process, as expressed by a linear function according to the following equation (3):

$$\sigma = S_1 \cdot (\hat{x}_1 - q) + S_2 \cdot \hat{x}_2 = 0 \quad (3)$$

Figure 7:
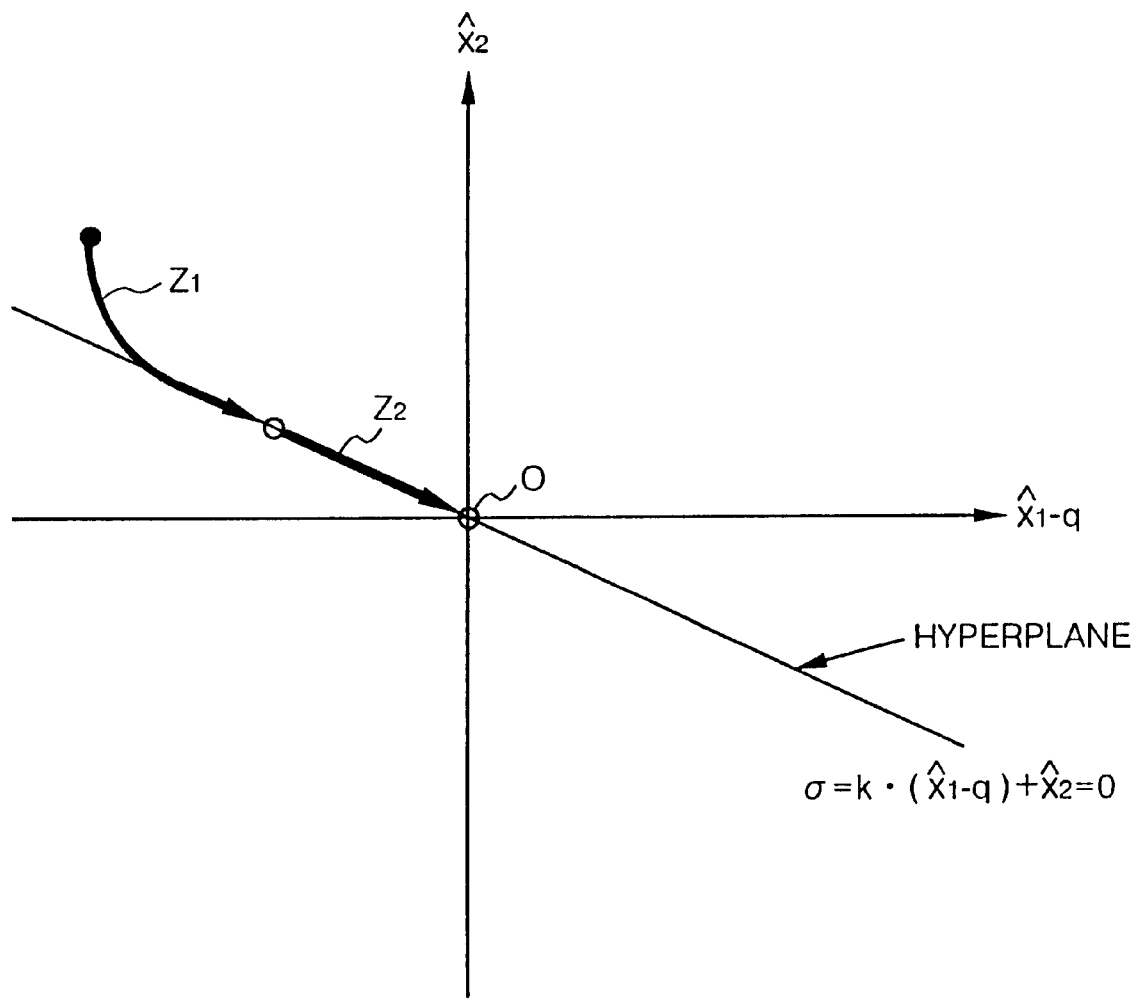
FIG. 7 is a diagram illustrative of a sliding mode control process used in the air-fuel ratio control system shown in FIG. 5.

In this embodiment, since the state quantities to be controlled by the adaptive sliding mode control process are two quantities (two-dimensional system), i.e., $x_1$ hat, $x_2$ hat, the hyperplane σ=0 is a straight line (also called a switching line) as shown in FIG. 7.

The adaptive sliding mode controller 19 converges the estimated quantities $x_1$ hat, $x_2$ hat of the post-CAT A/F onto the hyperplane σ=0 according to the reaching control law and adaptive control law of the adaptive sliding control process as indicated by the arrow Z1 in FIG. 7, and then converges the estimated quantities $x_1$ hat, $x_2$ hat toward a balanced point O on the hyperplane σ=0 where $x_1$ hat=q and $x_2$ hat=0 according to the so-called equivalent control input as indicated by the arrow Z2 while converging them onto the hyperplane σ=0, for thereby determining a correction quantity for the basic air-fuel ratio KBS.

More specifically, based on a model of the exhaust system A where the state quantities $x_{1M}$, $x_{2M}$ of the post-CAT A/F of the model shown in FIG. 6 are replaced with the estimated state quantities $x_1$ hat, $x_2$ hat, the adaptive sliding mode controller 19 determines a correction quantity $u_{s1}$ for the basic air-fuel ratio KBS from the estimated state quantities $x_1$ hat, $x_2$ hat of the post-CAT A/F according to the following equation (4):

$$u_{sl} = \frac{1}{b_M}\left[-(k - C_M)\cdot \hat{x}_2 + K_M \cdot \hat{x}_1 - J \cdot |\sigma|^\alpha \cdot sgn(\sigma) - 1 \cdot \int_0^1 \sigma dt\right] \quad (4)$$

In the equation (4), the first and second terms are equivalent control input terms capable of converting the estimated state quantities $x_1$ hat, $x_2$ hat toward the balanced point O on the hyperplane σ=0 where $x_1$ hat=q and $x_2$ hat=0 while converging them onto the hyperplane σ=0. The third term is a reaching control law term capable of converging the estimated state quantities $x_1$ hat, $x_2$ hat onto the hyperplane σ=0. In the third term, J and α are predetermined positive constants (0<α<1), and sgn (σ) represents a sign function of the linear function σ(see the equation (3)). The fourth term in the equation (4) is an adaptive control law term capable of eliminating the effect of disturbance or the like in converging the estimated state quantities $x_1$ hat, $x_2$ hat onto the hyperplane σ=0. In the fourth term, I is a predetermined constant (≧0). The constant I is provided for the purpose of adjusting the gain of the adaptive control law term. If no gain adjustment is required, the constant I may be set to I=1. If I=0, then since the adaptive control law term is "0", a normal sliding mode control process is carried out.

The state predictor 18 and the adaptive sliding mode controller 19 basically function as described above. The target air-fuel ratio calculator 16 which has the state predictor 18 and the adaptive sliding mode controller 19 adds the correction quantity $u_{s1}$ determined by the adaptive sliding mode controller 19 or a value produced by filtering and scaling the correction quantity $u_{s1}$ to the basic air-fuel ratio KBS thereby to calculate the target air-fuel ratio KCMD. The target air-fuel ratio KCMD thus determined is the air-fuel ratio of an exhaust gas to be supplied to the catalytic converter 4 for keeping the post-CAT A/F detected by the $O_2$ sensor 7 at the predetermined appropriate value q to enable the catalytic converter 4 to perform its optimum emission purifying capability.

In this embodiment, the coefficient k in the equations (3), (4) is variably established depending on how the estimated state quantities $x_1$ hat, $x_2$ hat are converged onto the hyperplane σ=0, by the adaptive sliding mode controller 19. Such variable establishment of the coefficient k is described in detail in Japanese patent application No. 8-84047 and will not be described below.

In the present embodiment, furthermore, the adaptive sliding mode control process is carried out in order to eliminate the effect of disturbance or the like as much as possible. However, the normal sliding mode control process (which does not include the adaptive control law term) may be employed to determine the corrective quantity $u_{s1}$ for the basic air-fuel ratio KBS, and the determined corrective quantity $u_{s1}$ may be added to the basic air-fuel ratio KBS to calculate the target air-fuel ratio KCMD.

Moreover, the state predictor 18 may be dispensed with, and a sliding mode control process may be employed to converge state quantities of the post-CAT A/F detected by the $O_2$ sensor, i.e., a value of the post-CAT A/F and a degree of change such as a change or rate of change thereof, respectively toward the "appropriate value q" and "0" for thereby determining the corrective quantity $u_{s1}$ for the basic air-fuel ratio KBS, and the determined corrective quantity $u_{s1}$ may be added to the basic air-fuel ratio KBS to calculate the target air-fuel ratio KCMD.

Referring back to FIG. 5, the feedback controller 17 comprises a general feedback controller 20 for feedback-controlling a total fuel injection quantity for all the cylinders of the internal combustion engine 1 so as to converge the pre-CAT A/F detected by the LAF sensor 6 toward the target air-fuel ratio KCMD, and a local feedback controller 21 for feedback-controlling a fuel injection quantity for each of the cylinders of the internal combustion engine 1.

The general feedback controller 20 determines a feedback correction coefficient KFB (corresponding to an adjustment quantity for the air-fuel mixture to be burned in the internal combustion engine 1) to correct the demand fuel injection quantity Tcyl so as to converge the pre-CAT A/F detected by the LAF sensor 6 toward the target air-fuel ratio KMCD.

The general feedback controller 20 comprises dividers 47, 48 for dividing a detected air-fuel ratio KACT produced from the LAF sensor 6 through filters 25a, 25b by a target air-fuel ratio KCMD calculated by the target air-fuel ratio calculator 16, i.e., for determining a ratio KACT/KCMD between the detected air-fuel ratio KACT and the target air-fuel ratio KCMD, a target value setting unit 49 for establishing a target value (=1) for the ratio KACT/KCMD, a PID controller 22 for determining a feedback correction coefficient KFB according to a known PID control process so as to converge the ratio KACT/KCMD produced by the divider 47 toward the target value (=1) established by the target value setting unit 49, and an adaptive controller 23 (indicated by "STR" in FIG. 5) which is a recursive-type controller for adaptively determining a feedback correction coefficient KFB so as to converge the ratio KACT/KCMD produced by the divider 48 toward the target value (=1) established by the target value setting unit 49, independently of the PID controller 22. The filters 25a, 25b have respective frequency bands that match the respective control characteristics of the PID controller 22 and the adaptive controller 23.

Since there is a dead time d' until the pre-CAT A/F corresponding to the target air-fuel ratio KCMD calculated by the target air-fuel ratio calculator 16 is detected by the LAF sensor 6, the dividers 47, 48 are supplied with the target air-fuel ratio KCMD through a time adjuster 50 which adjusts the dead time d'. The dead time d' is a time corresponding to 12 cycles each equal to a crankshaft angle period (so-called TDC) of the internal combustion engine 1.

In the general feedback controller 20, the feedback correction coefficients KFB separately determined by the PID controller 22 and the adaptive controller 23 are selected one at a time by a switcher 24, and the demand fuel injection quantity Tcyl is corrected by being multiplied by the selected feedback correction coefficient KFB. The feedback correction coefficient KFB determined by the PID controller 22 will hereinafter be referred to as "a feedback correction coefficient KLAF" and the feedback correction coefficient KFB determined by the adaptive controller 23 will hereinafter be referred to as "a feedback correction coefficient KSTR".

The adaptive controller 23 is described in detail in Japanese patent application No. 8-84047 corresponding to U.S. patent application Ser. No. 08/833091, and will not be described in detail below. However, the adaptive controller 23 is summarized as follows:

The adaptive controller 23 is a recursive-type controller for determining a feedback correction coefficient KSTR while compensating for dynamic behavioral changes such as changes in operating conditions of the internal combustion engine 1 or characteristic changes thereof. The adaptive controller 23 uses the parameter adjusting law proposed by I. D. Landau, et al., for example, and calculates the feedback correction coefficient KSTR using the established adaptive parameters.

In this embodiment, it is assumed that the internal combustion engine 1, which is an object to be controlled by the adaptive controller 23, is considered to be a plant of a first-order system having a dead time $d_p$ (corresponding to a time period of three combustion cycles of the internal combustion engine 1), and five adaptive parameters $s_0$, $r_1$, $r_2$, $r_3$, $b_0$ are established. An adaptive parameter θ hat (j) (j indicates the number of a control cycle) which is a vector quantity having the adaptive parameters $s_0$, $r_1$, $r_2$, $r_3$, $b_0$ as elements is defined according to the following equation (5):

$$\hat{\theta}^T(j) = [b_0(j), r_1(j), r_2(j), r_3(j), s_o(j)] \quad (5)$$

The adaptive parameter θ hat (j) is calculated by the following equation (6):

$$\hat{\theta}(j) = \hat{\theta}(j-1) + \Gamma(j-1) \cdot \xi(j-d_p) \cdot e^*(j) \quad (6)$$

where ξ(j) represents a vector quantity defined by the equation (7) below, with KP in the equation (7) representing the ratio KACT/KCMD, Γ(j) represents a gain matrix for determining a rate of establishing the adaptive parameter θ hat, and e*(j) an estimated error of the adaptive parameter θ hat. Γ(j) and e*(j) are expressed respectively by the following recursive formulas (8), (9):

$$\zeta^T(j) = [KSTR(j), KSTR(j-1), KSTR(j-2), KSTR(j-3), KP(j)] \quad (7)$$

$$\Gamma(j) = \quad (8)$$
$$\frac{1}{\lambda_1(j)}\left[\Gamma(j-1) = \frac{\lambda_2(j) \cdot \Gamma(j-1) \cdot \zeta(j-d_p) \cdot \zeta^T(j-d_p) \cdot \Gamma(j-1)}{\lambda_1(j) + \lambda_2(j) \cdot \zeta^T(j-d_p) \cdot \Gamma(j-1) \cdot \zeta(j-d_p)}\right]$$

where $0 < \lambda_1(j) \leq 1$, $0 < \lambda_2$, $\Gamma(0) > 0$.

$$e*(j) = \frac{D(Z^{-1}) \cdot KACT(j) - \hat{\theta}^T(j-1) \cdot \zeta(j-d_p)}{1 + \zeta^T(j-d_p) \cdot \Gamma(j-1) \cdot \zeta(j-d_p)} \quad (9)$$

where $D(Z^{-1})$ in the equation (9) represents an asymptotically stable polynomial for adjusting the convergence. In this embodiment, $D(Z^{-1})=1$.

Using the adaptive parameter θ hat ($s_0$, $r_1$, $r_2$, $r_3$, $b_0$) calculated according to the equation (6), the ratio KP (=KACT/KCMD) determined by the divider 48, and the feedback correction coefficient KSTR determined in the past by the adaptive controller 23, the adaptive controller 23 determines a feedback correction coefficient KSTR at the present time according to the recursive formula (10) given below.

$$KSTR(j) = \frac{KP_{TR} - s_0 \cdot KP(j) - r_1 \cdot KSTR(j-1) - r_2 \cdot KSTR(j-2) - r_3 \cdot KSTR(j-3)}{b_0} \quad (10)$$

where $KP_{TR}$ is a target value (=1) for the ratio KP (=KACT/KCMD).

In order to compensate for dynamic behavioral changes of the internal combustion engine 1, the adaptive controller 23 adjusts the adaptive parameters and calculates the feedback correction coefficient KSTR so as to converge the ratio KP (=KACT/KCMD) between the detected air-fuel ratio KACT produced from the LAF sensor 6 and the target air-fuel ratio KCMD calculated by the target air-fuel ratio calculator 16 toward the target value "1".

The PID controller 22, which is provided together with the adaptive controller 23 in the general feedback controller 20, calculates a proportional term (P term), an integral term (I term), and a derivative term (D term) from the difference between the air-fuel ratio KACT detected by the LAF sensor 6 and the target air-fuel ratio KCMD, and calculates the total of those terms as the feedback correction coefficient KLAF, as is the case with the general PID control process. In this embodiment, because the fuel injection quantity is corrected by being multiplied by the feedback correction coefficient KLAF, the feedback correction coefficient KLAF is "1" when the difference between the detected air-fuel ratio KACT and the target air-fuel ratio KCMD is "0". Therefore, the integral term (I term) has an initial value of "1". The gains of the proportional term, the integral term, and the derivative term are determined from the rotational speed and intake pressure of the internal combustion engine 1 using a predetermined map.

The switcher 24 of the general feedback controller 20 outputs the feedback correction coefficient KLAF determined by the PID controller 22 as the feedback correction coefficient KFB for correcting the fuel injection quantity if the combustion in the internal combustion engine 1 tends to be unstable as when the temperature of the coolant of the internal combustion engine 1 is low, the internal combustion engine 1 rotates at high speeds, or the intake pressure is low, or if the air-fuel ratio KACT detected by the LAF sensor 6 is not reliable due to a response delay of the LAF sensor 6 as when the target air-fuel ratio KCMD changes largely or immediately after the air-fuel ratio feedback control process has started, or if the internal combustion engine 1 operates highly stably as when it is idling and hence no high-gain control process by the adaptive controller 23 is required. Otherwise, the switcher 24 outputs the feedback correction coefficient KSTR determined by the adaptive controller 23 as the feedback correction coefficient KFB for correcting the fuel injection quantity. This is because the adaptive controller 23 effects a high-gain control process and functions to converge the air-fuel ratio KACT detected by the LAF sensor 6 quickly toward the target air-fuel ratio KCMD, and if the feedback correction coefficient KSTR determined by the adaptive controller 23 is used when the combustion in the internal combustion engine 1 is unstable or the air-fuel ratio KACT detected by the LAF sensor 6 is not reliable, then the air-fuel ratio control process tends to be unstable.

Such operation of the switcher 24 is disclosed in detail in Japanese patent application No. 7-227303 (Japanese laid-open patent publication No. 8-105345 which corresponds to U.S. Pat. No. 5,558,075), and will not be described in detail below.

The local feedback controller 21 comprises an observer 26 for estimating a real air-fuel ratio #nA/F (n=1, 2, 3, 4) of each of the cylinders from the air-fuel ratio KACT detected by the LAF sensor 6 (the air-fuel ratio in the junction of the exhaust pipes 2 extending from the respective cylinders of the internal combustion engine 1), and a plurality of PID controllers 27 (as many as the number of the cylinders) for determining a feedback correction coefficient #nKLAF (corresponding to an adjustment quantity for the air-fuel mixture per cylinder) for a fuel injection quantity for each of the cylinders from the real air-fuel ratio #nA/F of each of the cylinders estimated by the observer 26 according to a PID control process so as to eliminate variations of the air-fuel ratios of the cylinders.

Briefly stated, the observer 26 estimates a real air-fuel ratio #nA/F of each of the cylinders as follows: A system from the internal combustion engine 1 to the LAF sensor 6 is considered to be a system for being supplied with a real air-fuel ratio #nA/F of each of the cylinders and outputting an air-fuel ratio (pre-CAT A/F) detected by the LAF sensor 6 to the junction of the exhaust pipes 2, and is modeled in view of a detection response delay (e.g., a time lag of first order) of the LAF sensor 6 and a chronological contribution of the air-fuel ratio of each of the cylinders to the air-fuel ratio in the junction of the exhaust pipes 2. Based on the modeled system, a real air-fuel ratio #nA/F of each of the cylinders is estimated from the air-fuel ratio KACT detected by the LAF sensor 6.

Details of the observer 26 are disclosed in Japanese laid-open patent publication No. 7-83094 which corresponds to U.S. Pat. No. 5,531,208, for example, and will not be described below.

Each of the PID controllers 27 of the local feedback controller 21 divides the air-fuel ratio KACT detected by the LAF sensor 6 by an average value of the feedback correction coefficients #nKLAF determined by the respective PID controllers 27 in a preceding cycle time to produce a quotient value, and uses the quotient value as a target air-fuel ratio (which is identical for the cylinders) for the corresponding cylinder. Each of the PID controllers 27 then determines a feedback correction coefficient #nKLAF in a present cycle time so as to eliminate any difference between the target air-fuel ratio and the corresponding real air-fuel ratio #nA/F determined by the observer 26. The local feedback controller 21 multiplies a value, which has been produced by multiplying the demand fuel injection quantity Tcyl by the selected feedback correction coefficient KFB produced by the general feedback controller 20, by the feedback correction coefficient #nKLAF for each of the cylinders, thereby determining an output fuel injection quantity #nTout (n=1, 2, 3, 4) for each of the cylinders.

The output fuel injection quantity #nTout (n=1, 2, 3, 4) thus determined for each of the cylinders is corrected for accumulated fuel particles on intake pipe walls of the internal combustion engine 1 by a fuel accumulation corrector 28 in the control unit 8. The corrected output fuel injection quantity #nTout is applied to each of fuel injectors (not shown) of the internal combustion engine 1, which injects fuel into each of the cylinders with the corrected output fuel injection quantity #nTout. The correction of the output fuel injection quantity in view of accumulated fuel particles on intake pipe walls is disclosed in detail in Japanese laid-open patent publication No. 8-21273 which corresponds to U.S. Pat. No. 5,568,799, for example, and will not be described in detail below.

Figure 8:
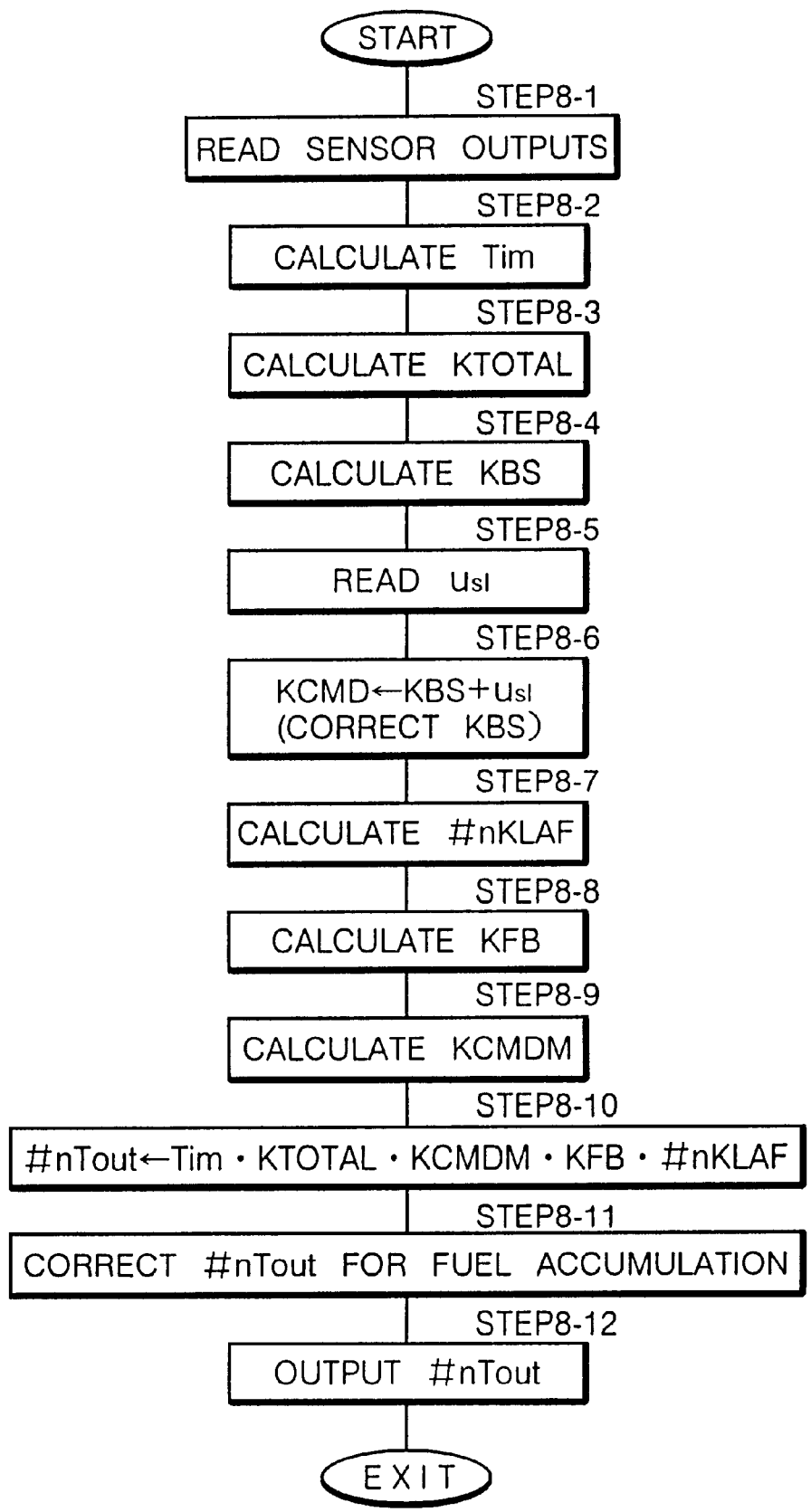
FIG. 8 is a flowchart of an operation sequence of the air-fuel ratio control system shown in FIG. 5.

The air-fuel ratio control system of the above structure controls the air-fuel ratio of the internal combustion engine 1 (specifically, the air-fuel ratio of an air-fuel mixture to be burned in each of the cylinders of the internal combustion engine 1) according to an operation sequence shown in FIG. 8.

Outputs from various sensors including the LAF sensor 6 and the $O_2$ sensor 7 are read in STEP8-1. The basic fuel injection quantity calculator 12 corrects a fuel injection quantity corresponding to the rotational speed and intake pressure of the internal combustion engine 1 with the effective opening area of the throttle valve, thereby calculating a basic fuel injection quantity Tim in STEP8-2. The first correction coefficient calculator 13 calculates a first correction coefficient KTOTAL depending on the coolant temperature and the amount by which the canister is purged in STEP8-3. The basic air-fuel ratio setting unit 15 establishes a basic air-fuel ratio KBS depending on the rotational speed of the internal combustion engine 1 and the intake pressure thereof in STEP8-4.

Then, the target air-fuel ratio calculator 16 reads a basic air-fuel ratio correction quantity $u_{s1}$ which has been calculated by the adaptive sliding mode controller 19 and stored in the non-illustrated memory in STEP8-5, and adds the basic air-fuel ratio correction quantity $u_{s1}$ to the basic air-fuel ratio KBS established in STEP8-4, thereby correcting the basic air-fuel ratio KBS into a target air-fuel ratio KCMD in STEP8-6.

In the local feedback controller 21, the PID controllers 27 calculate respective feedback correction coefficients #nKLAF in order to eliminate variations between the cylinders, based on actual air-fuel ratios #nA/F of the respective cylinders which have been estimated from the output signal of the LAF sensor 6 by the observer 26, in STEP8-7. Then, the general feedback controller 20 calculates a feedback correction coefficient KFB in STEP8-8.

In the general feedback controller 20, the PID controller 22 and the adaptive controller 23 determine feedback correction coefficients KLAF, KSTR independently of each other. Depending on whether the combustion in the internal combustion engine 1 or the air-fuel ratio detected by the LAF sensor 6 tends to be unstable, the switcher 24 determines whether the internal combustion engine 1 operates in an adaptive control region which demands an adaptive control process or not, and selects one of these feedback correction coefficients KLAF, KSTR and outputs the selected feedback correction coefficient as the feedback correction coefficient KFB.

When switching the feedback correction coefficient KFB from the feedback correction coefficient KLAF to the feedback correction coefficient KSTR, the adaptive controller 23 determines a feedback correction coefficient KSTR in a manner to hold the correction coefficient KFB (=KSTR) to the preceding correction coefficient KFB (=KLAF) as long as in the present cycle time in order to avoid an abrupt change in the feedback correction coefficient KFB. When switching the feedback correction coefficient KFB from the feedback correction coefficient KSTR to the feedback correction coefficient KLAF, the PID controller 22 calculates a present correction coefficient KLAF in a manner to regard the feedback correction coefficient KLAF determined by itself in the preceding cycle time as the preceding correction coefficient KFB (=KSTR).

After the feedback correction coefficient KFB has been calculated, the second correction coefficient calculator 14 calculates in STEP8-9 a second correction coefficient KCMDM depending on the target air-fuel ratio KCMD determined in STEP8-6.

Then, the control unit 8 multiplies the basic fuel injection quantity Tim, determined as described above, by the first correction coefficient KTOTAL, the second correction coefficient KCMDM, the feedback correction coefficient KFB, and the feedback correction coefficients #nKLAF of the respective cylinders, determining output fuel injection quantities #nTout of the respective cylinders in STEP8-10. The output fuel injection quantities #nTout are then corrected for accumulated fuel particles on intake pipe walls of the internal combustion engine 1 by the fuel accumulation corrector 28 in STEP8-11. The corrected output fuel injection quantities #nTout are applied to the nonillustrated fuel injectors of the internal combustion engine 1 in STEP8-12.

In the internal combustion engine 1, the fuel injectors inject fuel into the respective cylinders according to the respective output fuel injection quantities #nTout.

According to the above air-fuel ratio control process, the target air-fuel ratio calculator 16 calculates a target air-fuel ratio KCMD (an air-fuel ratio of an exhaust gas to be supplied to the catalytic converter 4) so as to equalize the post-CAT A/F (oxygen concentration) detected by the $O_2$ sensor downstream of the catalytic converter 4 to a predetermined adequate value q, stated otherwise, to enable the catalytic converter 4 to perform an optimum emission purifying capability, and controls the amount of fuel supplied to the internal combustion engine 1 so as to converge the pre-CAT A/F (=KACT) detected by the LAF sensor 6 toward the calculated target air-fuel ratio KCMD. In this fashion, the air-fuel ratio of an air-fuel mixture to be burned in the cylinders of the internal combustion engine 1 is controlled to generate an exhaust gas for causing the catalytic converter 4 to maintain an optimum emission purifying capability.

Since the calculation of the target air-fuel ratio KCMD is carried out according to the sliding mode control process with high convergence stability, the target air-fuel ratio KCMD (the air-fuel ratio of an exhaust gas to be supplied to the catalytic converter 4) which is suitable for stably maintaining an optimum emission purifying capability for the catalytic converter 4 can be determined accurately. In this embodiment, particularly, because the target air-fuel ratio KCMD is calculated according to the sliding mode control process which takes into account the effect of disturbance or the like while the dead time d present in the exhaust system A including the catalytic converter 4 is being compensated for by the state predictor 18, it is possible to determine the target air-fuel ratio KCMD which enables the catalytic converter 4 to perform an optimum emission purifying capability highly accurately and stably. Furthermore, when the feedback controller 17 controls the pre-CAT A/F at the target air-fuel ratio KCMD, the local feedback controller 21 basically uses the feedback correction coefficient KSTR determined by the adaptive controller 23 while eliminating the difference between air-fuel ratios of the cylinders of the internal combustion engine 1. Consequently, the pre-CAT A/F can be converged quickly toward the target air-fuel ratio KCMD (the air-fuel ratio of an exhaust gas to be supplied to the catalytic converter 4 to enable the catalytic converter 4 to perform an optimum emission purifying capability) with high stability.

A method of judging a deterioration of a catalytic converter according to the first embodiment of the present invention, which is effected on the air-fuel ratio control system, will be described below.

In FIG. 5, the air-fuel ratio control system has a catalytic converter deterioration judging unit 100 for judging a deterioration of the catalytic converter 4 based on the target air-fuel ratio KCMD calculated by the target air-fuel ratio calculator 16, and an alarm generator 101 for generating an alarm based on a determined result from the catalytic converter deterioration judging unit 100. The alarm generator 101 comprises an alarm lamp which can be continuously or intermittently turned on to generate alarm light or a buzzer which can be energized to generate alarm sound.

Figure 9:
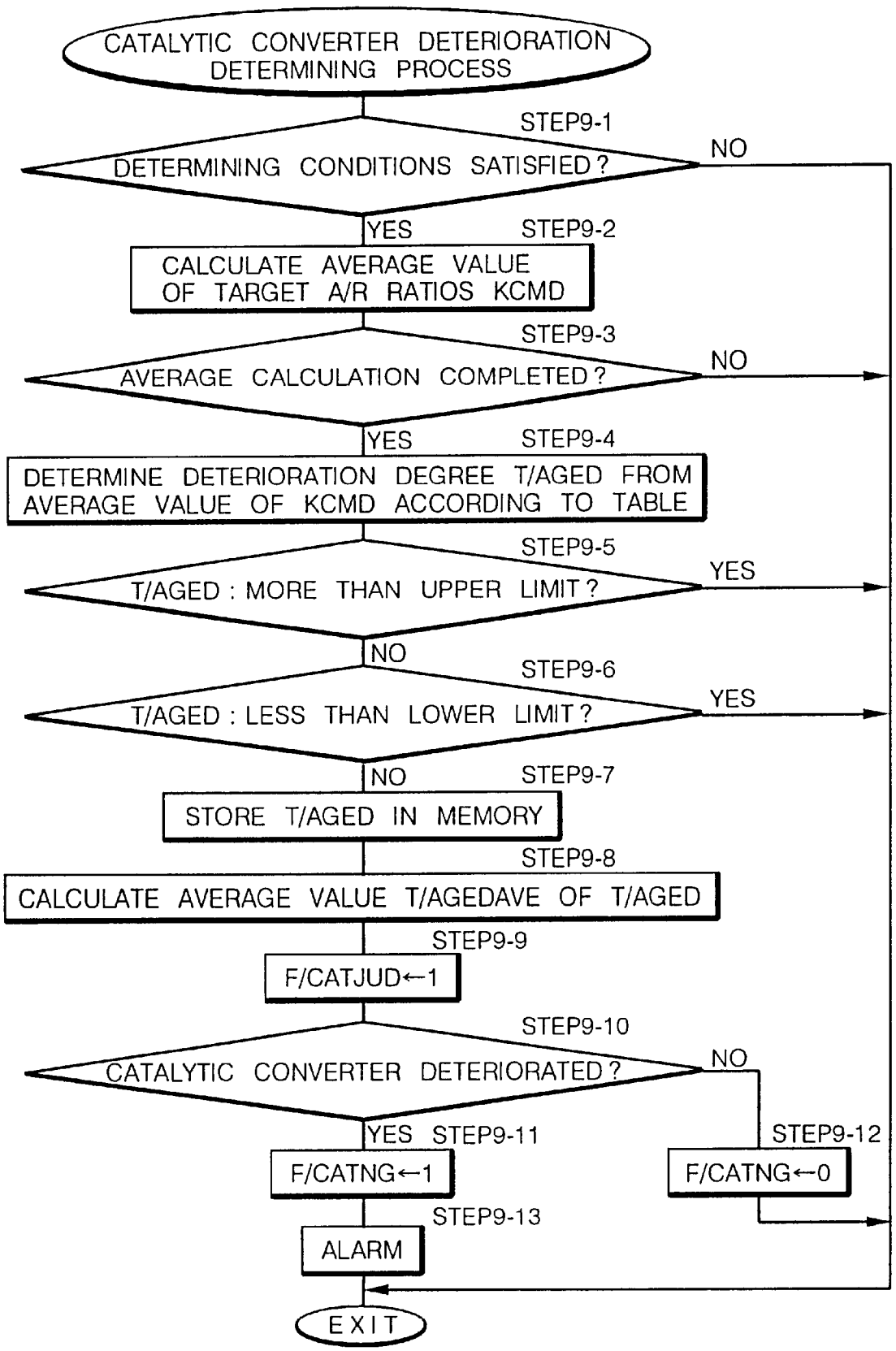
FIG. 9 is a flowchart of an operation sequence of a method of judging a deterioration of a catalytic converter according to a first embodiment of the present invention.

In this embodiment, the catalytic converter deterioration judging unit 100 operates according to an operation sequence shown in FIG. 9 in each given cycle time to judge a deterioration of the catalytic converter 4. As shown in FIG. 9, the catalytic converter deterioration judging unit 100 determines whether conditions required to judge a deterioration of the catalytic converter 4 are satisfied or not in STEP9-1. The conditions include whether the determination of a deterioration of the catalytic converter 4 has not yet been carried out or not under present operating conditions of the internal combustion engine 1 (i.e., whether a flag F-CATJUD, described later on, is "0" or not), whether the above control of the air-fuel ratio of the internal combustion engine 1 is being conducted or not, whether the output level of the $O_2$ sensor 7 is controlled at the level V0 (see FIG. 3) corresponding to the value q of the post-CAT A/F, and whether the catalytic converter 4 is sufficiently activated (more specifically, whether the temperature of the catalytic converter 4 falls in a temperature range which allows the catalytic converter 4 to be sufficiently active. If these conditions are not satisfied (NO in STEP9-1), then the present cyclic processing is brought to an end. Whether the catalytic converter 4 is sufficiently activated is determined on the basis of the coolant temperature of the internal combustion engine 1 and a period of time that has elapsed from the start of the internal combustion engine 1. Alternatively, whether the catalytic converter 4 is sufficiently activated may be determined on the basis of a temperature of the catalytic converter 4 which is directly detected by a temperature sensor.

If the conditions in STEP9-1 are satisfied, then the catalytic converter deterioration judging unit 100 reads the target air-fuel ratio KCMD calculated by the target air-fuel ratio calculator 16, i.e., samples the target air-fuel ratio KCMD, and calculates an average value thereof in each cycle time in STEP9-2. The catalytic converter deterioration judging unit 100 determines whether the calculation of the average value of the target air-fuel ratio KCMD is completed or not based on whether the average value is calculated a predetermined number of times or for a predetermined time in STEP9-3, and repeats STEP9-1~9-3 in each cycle time until the calculation of the average value of the target air-fuel ratio KCMD is completed.

Figure 10:
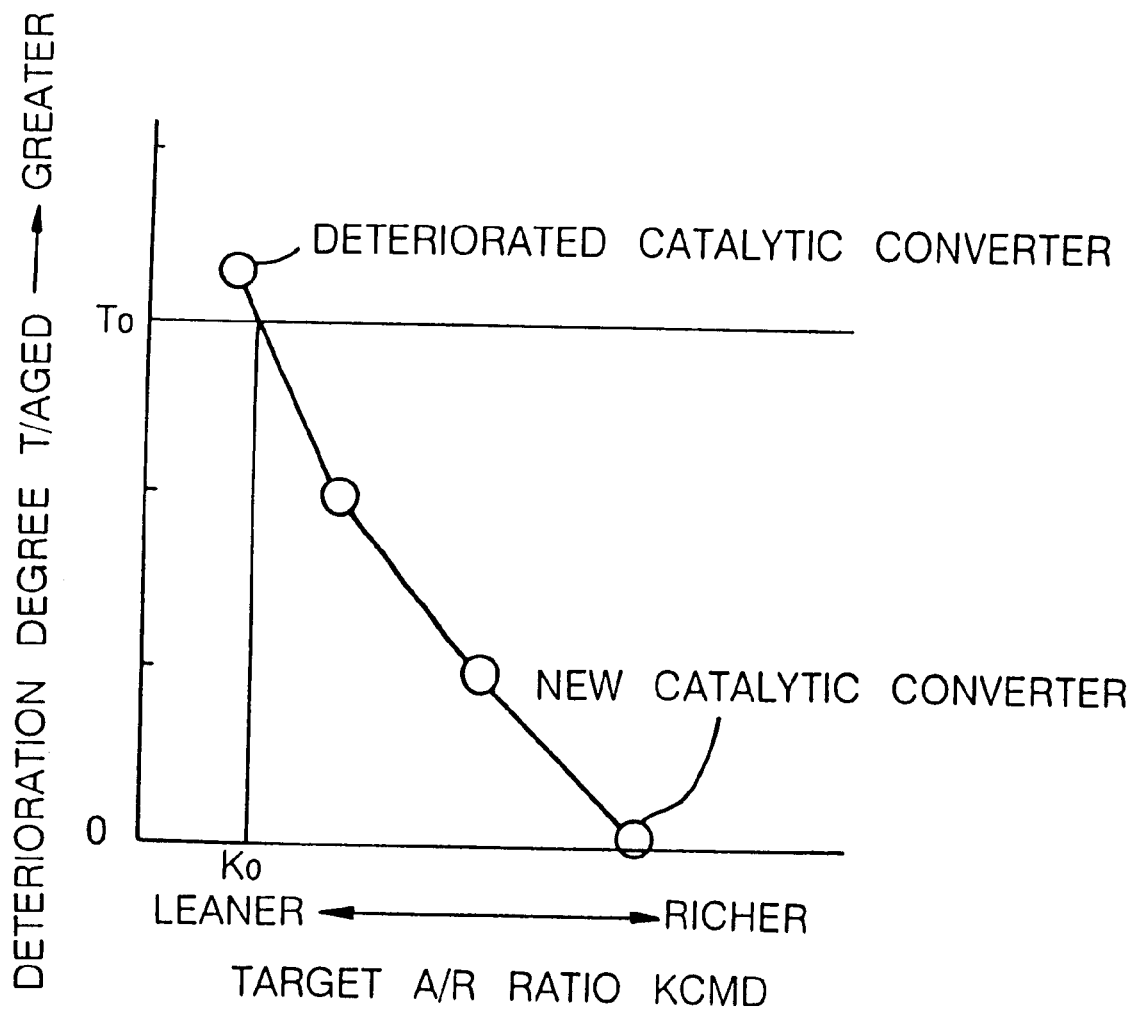
FIG. 10 is a diagram showing a data table used in the operation sequence shown in FIG. 9.

When the calculation of the average value of plural sampled data of the target air-fuel ratio KCMD is completed, the catalytic converter deterioration judging unit 100 determines a deterioration degree T/AGED of the catalytic converter 4 based on a given data table shown in FIG. 10, for example, from the calculated average value of the target air-fuel ratio KCMD in STEP9-4. Since, as described above, the target air-fuel ratio KCMD (the target value for the pre-CAT A/F) is shifted toward the leaner side as the catalytic converter 4 is deteriorated, the data table shown in FIG. 10 is established such that as the average value of the target air-fuel ratio KCMD is shifted toward the leaner side, the value of the deterioration degree T/AGED of the catalytic converter 4 becomes greater. The average value of the target air-fuel ratio KCMD itself may be used as corresponding to the deterioration degree T/AGED of the catalytic converter 4.

Then, in order to eliminate errors or the like, the catalytic converter deterioration judging unit 100 determines whether the determined value of the deterioration degree T/AGED falls in a range between upper and lower limits or not in STEP9-5, STEP9-6. If it falls in the range, then the value of the deterioration degree T/AGED is stored in a memory (not shown) in STEP9-7.

If it does not fall in the range in STEP9-5, STEP9-6, then the determined value of the deterioration degree T/AGED is not stored in the memory, and the steps from STEP9-1 are repeated to determine a deterioration of the catalytic converter 4.

A deterioration degree T/AGED of the catalytic converter 4 is determined and stored in the memory each time the internal combustion engine 1 is operated. Each time the internal combustion engine 1 is operated, an average value T/AGEDAVE of the deterioration degree T/AGED of the catalytic converter 4 which is stored in the memory is calculated in STEP9-8. Specifically, an average value T/AGEDAVE of the deterioration degree T/AGED of the catalytic converter 4 which is determined when the internal combustion engine 1 has been operated a plurality of times, e.g., 6 times, is calculated.

The catalytic converter deterioration judging unit 100 sets the flag F/CATJUD used in STEP9-1 to "1" in STEP9-9, and determines whether the catalytic converter 4 has already been in a deteriorated state or not based on the average value T/AGEDAVE of the deterioration degree of the catalytic converter 4 in STEP9-10. The flag F/CATJUD which is set to "1" in STEP9-9 is used to determine whether the deterioration degree T/AGED of the catalytic converter 4 has been calculated and stored for the present operation of the internal combustion engine 1 or not, and is reset to "0" each time the internal combustion engine 1 begins to operate.

The catalytic converter deterioration judging unit 100 determines whether the catalytic converter 4 has already been in a deteriorated state or not in STEP9-10 by comparing the average value T/AGEDAVE with a predetermined reference value TO shown in FIG. 10. If T/AGEDAVE>T0, then the catalytic converter deterioration judging unit 100 judges the catalytic converter 4 as being deteriorated. Then, the catalytic converter deterioration judging unit 100 sets a flag F/CATNG indicative of a deteriorated state to "1" in STEP9-11. If the average value T/AGEDAVE is smaller than the reference value TP, the catalytic converter deterioration judging unit 100 judges the catalytic converter 4 as being not deteriorated, and sets the flag F/CATNG to "0" in STEP9-12.

After the catalytic converter 4 is judged as being deteriorated and the flag F/CATNG is set to "1", the alarm generator 101 generates an alarm in STEP9-13, prompting the user to replace the catalytic converter 4.

Judging the deteriorated state in STEP9-10 is basically the same as comparing the average value of plural sampled data of the target air-fuel ratio KCMD with a reference value KO shown in FIG. 10 to determine whether the average value of the target air-fuel ratio KCMD is on the leaner side or richer side of the reference value K0.

According to the first embodiment, therefore, it is possible to judge a deterioration of the catalytic converter 4 while the air-fuel ratio of the internal combustion engine 1 (specifically, the air-fuel ratio of an air-fuel mixture to be burned in the internal combustion engine 1) is being controlled by the air-fuel ratio control system to enable the catalytic converter to perform an optimum emission purifying capability.

Since the air-fuel ratio control system calculates the target air-fuel ratio KCMD, which is the air-fuel ratio of an exhaust gas to be supplied to the catalytic converter 4, according to the sliding mode control process and controls the air-fuel ratio of the internal combustion engine 1 according to the adaptive control process to control the pre-CAT A/F (the air-fuel ratio of an exhaust gas actually supplied to the catalytic converter 4) detected by the LAF sensor 6 at the target air-fuel ratio KCMD accurately and stably, the target air-fuel ratio KCMD for achieving an optimum emission purifying capability for the catalytic converter 4 can be determined stably and highly accurately. Consequently, a deteriorated state of the catalytic converter 4 can be judged accurately and stably using the target air-fuel ratio KCMD in the air-fuel ratio control process.

Furthermore, a deterioration degree of the catalytic converter 4 is recognized by determining an average value of plural sampled data of the target air-fuel ratio KCMD when the internal combustion engine 1 operates, and judged on the basis of an average value of the deterioration degree over a plurality of operations in the past of the internal combustion engine 1.

In the present embodiment, of the amount of the exhaust gas (the rate of the exhaust gas flowing through the catalytic converter 4) and the active state of the catalytic converter 4, which are indicative of operating states of the catalytic converter 4 which affect the target air-fuel ratio KCMD, the amount of the exhaust gas is not taken into consideration. However, the sufficient activation of the catalytic converter 4 may be confirmed, an average value of plural sampled data of the target air-fuel ratio KCMD calculated in a predetermined operating state of the catalytic converter 4 under which the amount of the exhaust gas supplied from the internal combustion engine 1 to the catalytic converter 4 (which can be recognized from the amount of fuel supplied to the internal combustion engine 1) is a predetermined amount or in the vicinity thereof, may be determined, after which a deterioration degree of the catalytic converter 4 may be recognized from the calculated average value to judge a deteriorated state of the catalytic converter 4. In this manner, the accuracy (reliability) of the determination of a deteriorated state of the catalytic converter 4 may further be increased.

A method of judging a deterioration of a catalytic converter according to a second embodiment of the present invention will be described below with reference to FIGS. 11 and 12. The method according to the second embodiment determines a deteriorated state of the catalytic converter 4 with the air-fuel ratio control system described above with respect to the first embodiment, and is characterized by a different judging process from the process of the first embodiment. Those parts used in the method according to the second embodiment which are identical to those of the method according to the first embodiment are denoted by identical reference numerals, and will not be described in detail below.

Referring to FIG. 5, the air-fuel ratio control system which is used to carry out the method according to the second embodiment also has the catalytic converter deterioration judging unit 100 and the alarm generator 101. According to the second embodiment, the catalytic converter deterioration judging unit 100 is supplied with not only the target air-fuel ratio KCMD calculated by the target air-fuel ratio calculator 16, but also the basic fuel injection quantity Tim calculated by the basic fuel injection quantity calculator 12, as indicated by the imaginary lines in FIG. 5, the basic fuel injection quantity Tim representing the amount of an exhaust gas discharged by the internal combustion engine 1.

Figure 11:
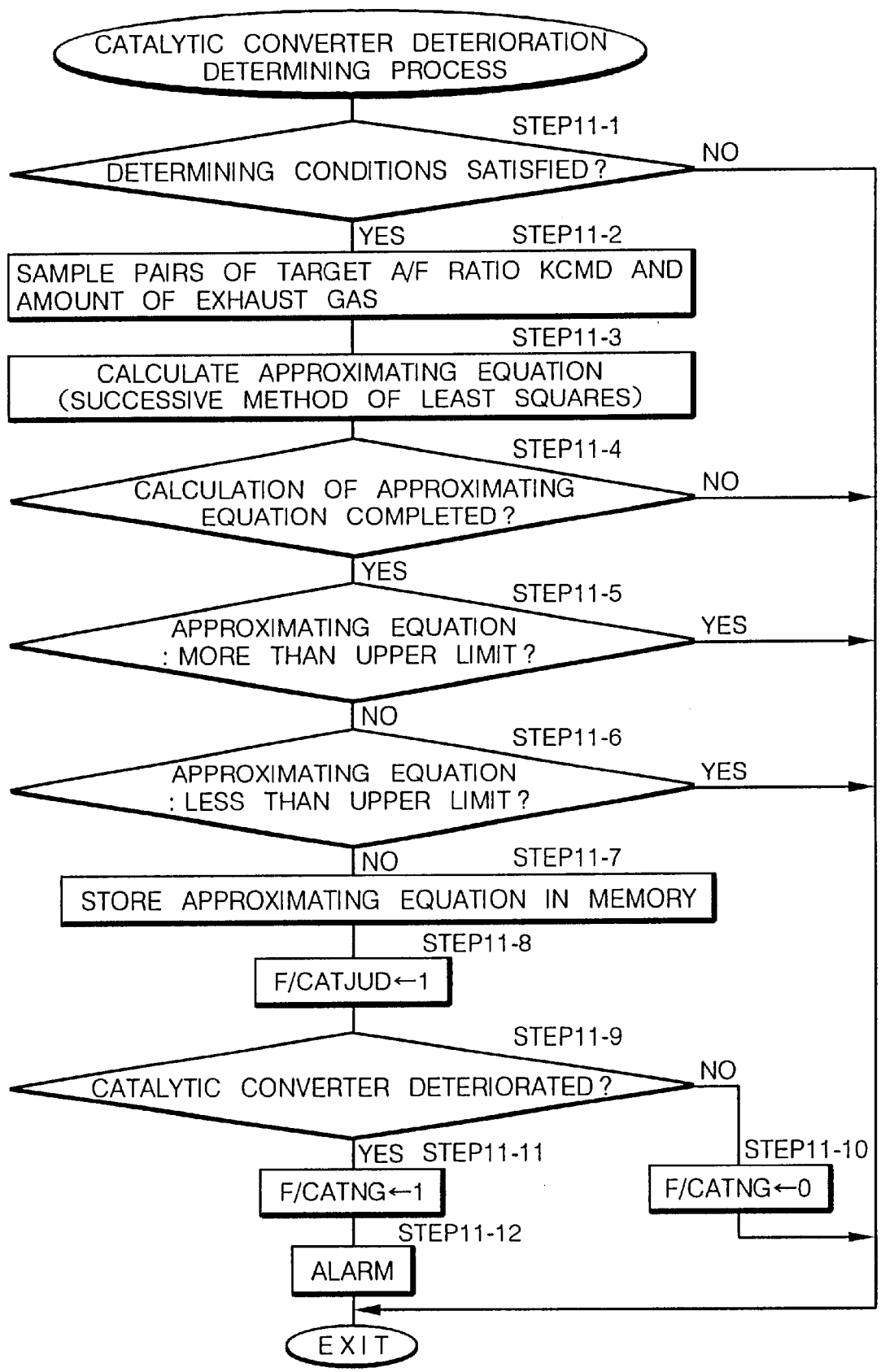
FIG. 11 is a flowchart of an operation sequence of a method of judging a deterioration of a catalytic converter according to a second embodiment of the present invention.

According to the second embodiment, the catalytic converter deterioration judging unit 100 takes into account the effect which operating states of the catalytic converter 4, including the amount of the exhaust gas flowing through the catalytic converter 4, has on the target air-fuel ratio KCMD for the pre-CAT A/F, and judges a deteriorated state of the catalytic converter 4 according to an operation sequence shown in FIG. 11 in each given cycle time.

The catalytic converter deterioration judging unit 100 first determines whether conditions (including whether the catalytic converter 4 is sufficiently activated) required to judge a deterioration of the catalytic converter 4 are satisfied or not in STEP11-1. If the conditions are satisfied, the catalytic converter deterioration judging unit 100 samples paired data (indicated by white dots in FIG. 12) of the target air-fuel ratio KCMD and the amount of the exhaust gas from the internal combustion engine 1 as recognized by the basic fuel injection quantity Tim in each cycle time in STEP11-2, and successively updates and calculates the equation of a polynomial curve (a polynomial indicative of a correlation between the target air-fuel ratio KCMD and the amount of the exhaust gas) that approximates the sampled data according to a successive method of least squares in STEP11-3. Then, the catalytic converter deterioration judging unit 100 determines whether the calculation of the approximating equation is completed or not by determining whether the approximating equation according to the successive method of least square has been updated a predetermined number of times or not, in STEP11-4.

The paired data may be stored, and the approximating equation may be calculated according to an ordinary method of least square when a predetermined number of paired data are collected.

In this manner, the equation of a polynomial curve which approximates a correlation between the target air-fuel ratio KCMD and the amount of the exhaust gas as indicated by the solid line "a" is determined.

Then, the catalytic converter deterioration judging unit 100 determines whether the value of the target air-fuel ratio KCMD at each amount of the exhaust gas indicated by the equation of the polynomial curve falls in a range between upper and lower limits in STEP11-5, STEP11-6. If it does not fall in the range, the steps from STEP11-1 are repeated to determine the equation of a polynomial curve representing a correlation between the target air-fuel ratio KCMD and the amount of the exhaust gas.

If the value of the target air-fuel ratio KCMD falls in the range in STEP11-5, STEP11-6, then the determined equation of the polynomial curve is stored in a memory (not shown) in STEP11-7. The catalytic converter deterioration judging unit 100 sets the flag F/CATJUD, which indicates whether a deteriorated state has been judged, to "1" in STEP11-8, and determines whether the catalytic converter 4 is in a deteriorated state or not based on the equation of the polynomial curve in STEP11-9.

Figure 12:
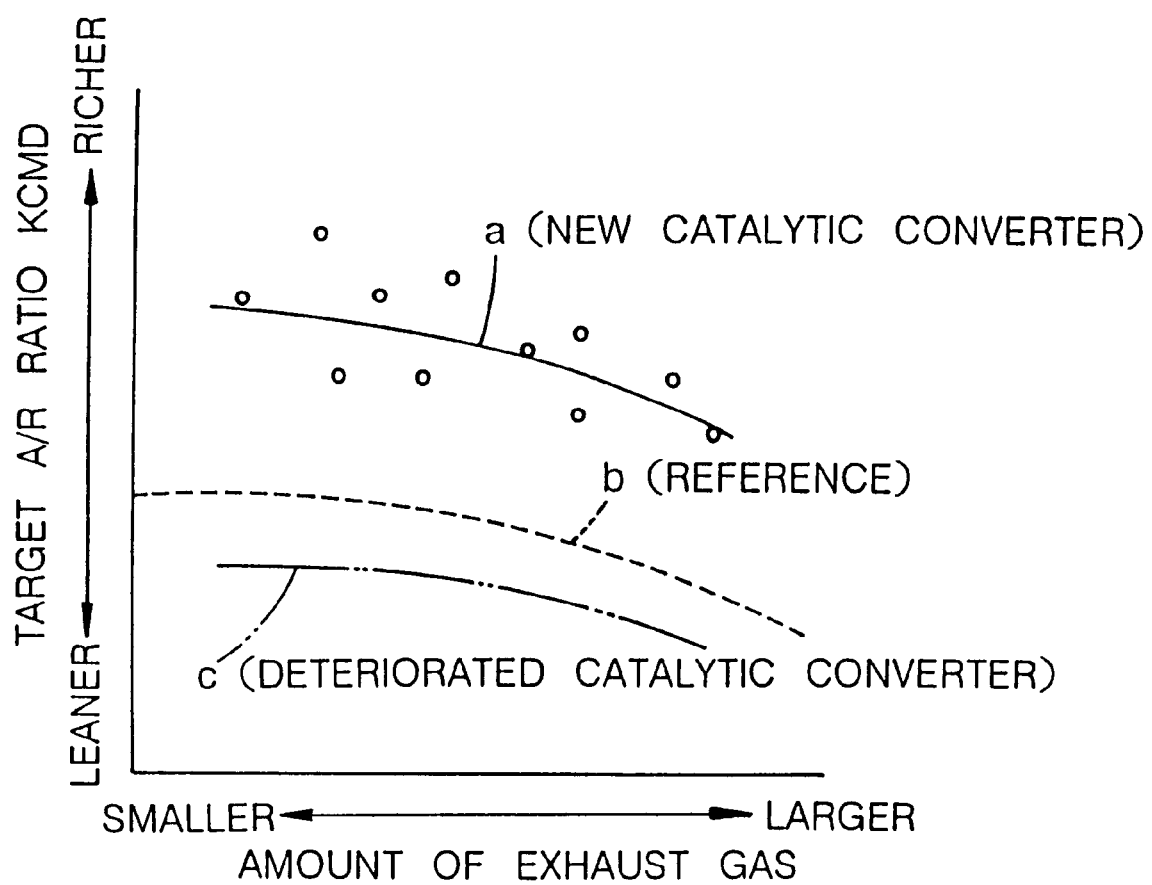
FIG. 12 is a diagram illustrative of the operation sequence shown in FIG. 11.

If the value of the target air-fuel ratio KCMD at each amount of the exhaust gas indicated by the equation of the polynomial curve is greater than a value indicated by a predetermined reference curve (reference characteristics of the target air-fuel ratio with respect to the amount of the exhaust gas) indicated by the broken line "b" in FIG. 12, i.e., if the polynomial curve is above the reference curve "b" (on the richer side of the air-fuel ratio) as indicated by the solid line "a" in FIG. 12, then the catalytic converter deterioration judging unit 100 determines that the catalytic converter 4 has not yet been deteriorated, and sets the flag F/CATNG, which indicates whether the catalytic converter 4 is in a deteriorated state or not, to "0" in STEP11-10. If the value of the target air-fuel ratio KCMD at each amount of the exhaust gas indicated by the equation of the polynomial curve is smaller than the value indicated by the predetermined reference curve indicated by the broken line "b" in FIG. 12, i.e., if the polynomial curve is below the reference curve "b" (on the leaner side of the air-fuel ratio) as indicated by the imaginary line "c" in FIG. 12, then the catalytic converter deterioration judging unit 100 determines that the catalytic converter 4 has been deteriorated, and sets the flag F/CATNG to "1" in STEP11-11. The alarm generator 101 generates an alarm in STEP11-12, prompting the user to replace the catalytic converter 4.

The determined polynomial curve may cross the reference curve "b". If the determined polynomial curve crosses the reference curve "b" (a portion of the determined polynomial curve lies below the reference curve "b"), then the catalytic converter deterioration judging unit 100 may determine that the catalytic converter 4 has been deteriorated, or alternatively, if the entire polynomial curve lies below the reference curve "b" (the polynomial curve and the reference curve "b" do not cross each other), then the catalytic converter deterioration judging unit 100 may determine that the catalytic converter 4 has been deteriorated. This process, including the establishment of the reference curve "b", may be determined on the basis of experimental data or the like.

In the second embodiment, a deterioration of the catalytic converter 4 can appropriately be determined while the air-fuel ratio control system is controlling the air-fuel ratio of the internal combustion engine 1 to enable the catalytic converter 4 to perform an optimum emission purifying capability. Since the equation of a polynomial curve indicative of a correlation between the target air-fuel ratio KCMD and the amount of the exhaust gas while the catalytic converter 4 is being activated is determined, it is possible to judge a deterioration of the catalytic converter 4 with accurately regardless of operating states of the catalytic converter 4 such as the amount of the exhaust gas. Furthermore, inasmuch as the method of least squares is used to determine the equation of a polynomial curve, the equation of a polynomial curve may be determined without storing a number of sampled data of paired data of the target air-fuel ratio KCMD and the amount of the exhaust gas, and hence the storage capacity of the memory used may be small.

Figure 4:
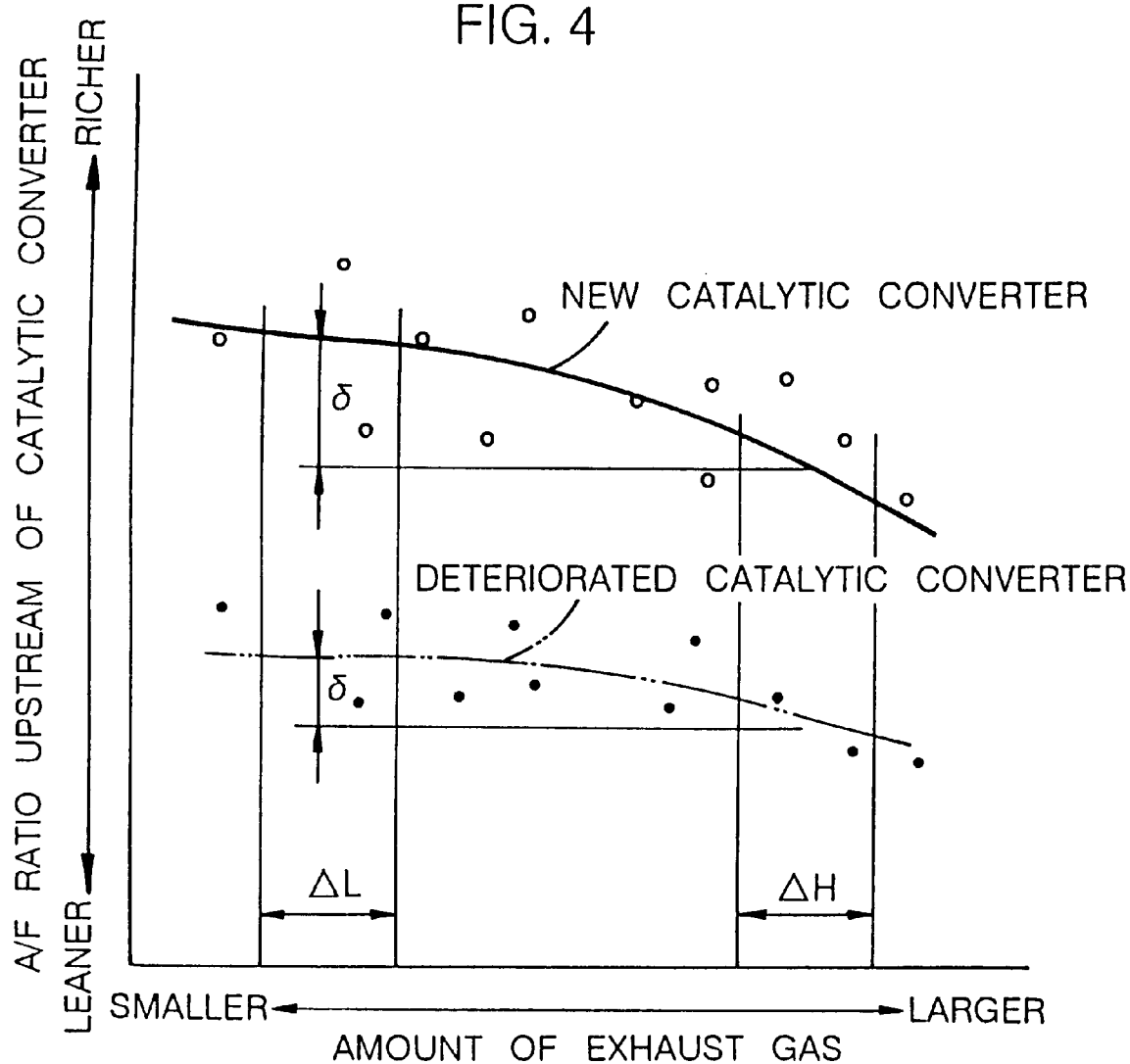
FIG. 4 is a diagram illustrative of the principles of the method of judging a deterioration of a catalytic converter according to the present invention.

A method of judging a deterioration of a catalytic converter according to a third embodiment of the present invention will be described below with reference to FIGS. 4, 5, and 13. The method according to the third embodiment determines a deteriorated state of the catalytic converter 4 with the air-fuel ratio control system described above with respect to the first embodiment, and is characterized by a different judging process from the processes of the first and second embodiments. Those parts used in the method according to the third embodiment which are identical to those of the methods according to the first and second embodiments are denoted by identical reference numerals, and will not be described in detail below.

Referring to FIG. 5, the catalytic converter deterioration judging unit 100 is supplied with not only the target air-fuel ratio KCMD calculated by the target air-fuel ratio calculator 16, but also the basic fuel injection quantity Tim calculated by the basic fuel injection quantity calculator 12, the basic fuel injection quantity Tim representing the amount of an exhaust gas discharged by the internal combustion engine 1, as is the case with the second embodiment.

Figure 13:
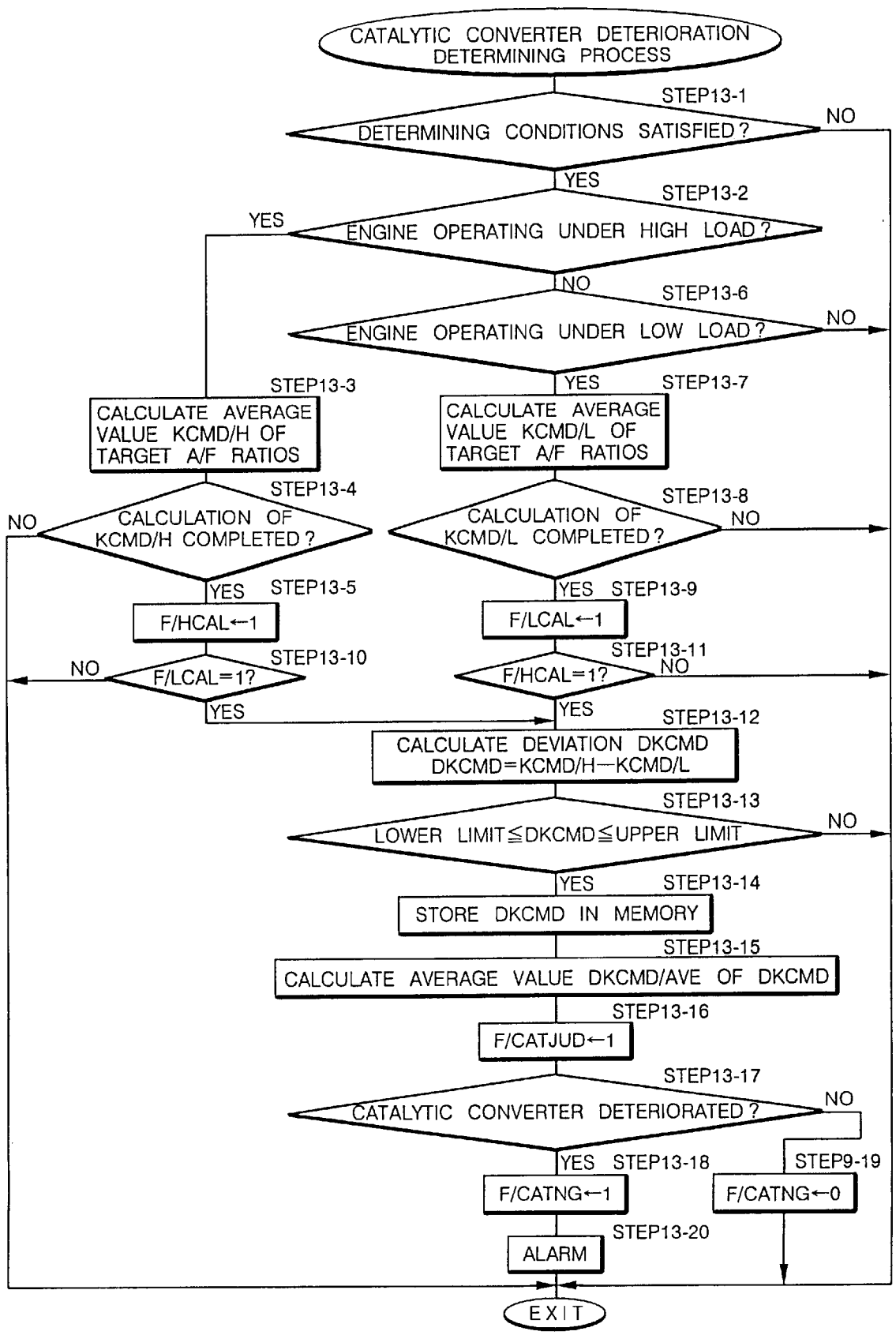
FIG. 13 is a flowchart of an operation sequence of a method of judging a deterioration of a catalytic converter according to a third embodiment of the present invention.

According to the third embodiment, the catalytic converter deterioration judging unit 100 judges a deteriorated state of the catalytic converter 4 according to an operation sequence shown in FIG. 13 in each given cycle time.

The catalytic converter deterioration judging unit 100 first determines whether conditions (including whether the catalytic converter 4 is sufficiently activated) required to judge a deterioration of the catalytic converter 4 are satisfied or not in STEP13-1, as is the case with STEP9-1 (see FIG. 9) according to the first embodiment and STEP11-1 (see FIG. 11) according to the second embodiment. If the conditions are not satisfied, then the present cyclic processing is ended.

If the conditions are satisfied, then the catalytic converter deterioration judging unit 100 determines whether the internal combustion engine 1 is operating under a high load with a relatively large amount of exhaust gas flowing through the catalytic converter 4 in STEP13-2. This judgment is effected by determining whether the amount of the exhaust gas as recognized by the basic fuel injection quantity Tim falls in a predetermined range indicated by ΔH in FIG. 4. If the amount of the exhaust gas is in the range ΔH, then the internal combustion engine 1 is judged as operating under a high load.

If the internal combustion engine 1 is judged as operating under a high load in STEP13-2, then the catalytic converter deterioration judging unit 100 reads a target air-fuel ratio KCMD calculated by the target air-fuel ratio calculator 16 while the internal combustion engine 1 is operating under a high load, and calculates an average value KCMD/H thereof in each cycle time in STEP13-3. The catalytic converter deterioration judging unit 100 then determines whether the calculation of the average value KCMD/H of the target air-fuel ratio KCMD is completed or not based on whether the average value is calculated a predetermined number of times or for a predetermined time in STEP13-4, and repeats the above steps from STEP13-1 in each cycle time until the calculation of the average value KCMD/H is completed. If the calculation of the average value KCMD/H while the internal combustion engine 1 is operating under a high load is completed, then the catalytic converter deterioration judging unit 100 sets a flag F/HCAL indicative of the completion of the calculation of the average value KCMD/H to "1"(F/HCAL=1 indicates the completion of the calculation of the average value KCMD/H) in STEP13-5.

If the internal combustion engine 1 is judged as not operating under a high load in STEP13-2, then the catalytic converter deterioration judging unit 100 determines whether the internal combustion engine 1 is operating under a low load with a relatively small amount of exhaust gas flowing through the catalytic converter 4 in STEP13-6. This judgment is effected by determining whether the amount of the exhaust gas as recognized by the basic fuel injection quantity Tim falls in a predetermined range indicated by ΔL in FIG. 4. If the amount of the exhaust gas is in the range ΔL, then the internal combustion engine 1 is judged as operating under a low load.

If the internal combustion engine 1 is judged as operating under a low load in STEP13-6 (at this time, the internal combustion engine 1 is not operating under a high load), then the catalytic converter deterioration judging unit 100 reads a target air-fuel ratio KCMD calculated by the target air-fuel ratio calculator 16 while the internal combustion engine 1 is operating under a low load, and calculates an average value KCMD/L thereof in each cycle time in STEP13-7. The catalytic converter deterioration judging unit 100 then determines whether the calculation of the average value KCMD/L of the target air-fuel ratio KCMD is completed or not based on whether the average value is calculated a predetermined number of times or for a predetermined time in STEP13-8, and repeats the above steps from STEP13-1 in each cycle time until the calculation of the average value KCMD/L is completed. If the calculation of the average value KCMD/L while the internal combustion engine 1 is operating under a low load is completed, then the catalytic converter deterioration judging unit 100 sets a flag F/LCAL indicative of the completion of the calculation of the average value KCMD/L to "1"(F/LCAL=1 indicates the completion of the calculation of the average value KCMD/L) in STEP13-9.

If the calculation of the average value KCMD/H while the internal combustion engine 1 is operating under a high load or the calculation of the average value KCMD/L while the internal combustion engine 1 is operating under a low load is completed, the catalytic converter deterioration judging unit 100 determines whether the calculation of the average values KCMD/H, KCMD/L is completed on the basis of the values of the flags F/HCAL, F/LCAL in STEP13-10, STEP13-11. If the calculation of either one of the average values is not completed, then the steps from STEP13-1 are repeated.

If the calculation of the average values KCMD/H, KCMD/L is completed, the catalytic converter deterioration judging unit 100 calculates a deviation DKCMD (=KCMD/H-KCMD/L) therebetween in STEP13-12. The deviation DKCMD corresponds to the deviation δ shown in FIG. 4, and indicates a rate of change of the target air-fuel ratio KCMD with respect to a change of the operating states of the catalytic converter 4 (more specifically, a change in the amount of the exhaust gas). Therefore, the deviation DKCMD represents the degree of deterioration of the catalytic converter 4.

Then, in order to eliminate errors or the like, the catalytic converter deterioration judging unit 100 determines whether the determined deviation DKCMD falls in a range between upper and lower limits or not in STEP13-13. If it falls in the range, then the deviation DKCMD is stored in a memory (not shown) in STEP13-14.

If the deviation DKCMD does not fall in the range, then the catalytic converter deterioration judging unit 100 does not store the determined deviation DKCMD, but repeats the steps from STEP13-1 to determine a deviation DKCMD.

The deviation DKCMD is determined and stored in the memory each time the internal combustion engine 1 is operated. Each time the internal combustion engine 1 is operated, an average value DKCMD/AVE of the deviation DKCMD which is stored in the memory is calculated in STEP13-15. Specifically, an average value DKCMD/AVE of the deviation DKCMD which is determined when the internal combustion engine 1 is operated a plurality of times, e.g., 6 times, is calculated.

The catalytic converter deterioration judging unit 100 sets a flag F/CATJUD, which is indicative of whether the deviation DKCMD has been calculated and stored each time the internal combustion engine 1 is operated, to "1" in STEP13-16, and determines whether the catalytic converter 4 has already been in a deteriorated state or not based on the average value DKCMD/AVE of the deviation DKCMD in STEP13-17.

Since the deviation DKCMD or its average value DKCMD/AVE becomes smaller as the catalytic converter 4 is deteriorated, the catalytic converter deterioration judging unit 100 determines whether the catalytic converter 4 has already been in a deteriorated state or not in STEP13-17 by comparing the average value DKCMD/AVE with a predetermined reference value (e.g., the gradient of the reference curve indicated by the broken line in FIG. 12). If the average value DKCMD/AVE is smaller than the predetermined reference value, then the catalytic converter deterioration judging unit 100 judges the catalytic converter 4 as being deteriorated, and sets a flag F/CATNG indicative of a deteriorated state to "1" in STEP13-18. If the average value DKCMD/AVE is greater than the predetermined reference value, the catalytic converter deterioration judging unit 100 judges the catalytic converter 4 as being not deteriorated, and sets the flag F/CATNG to "0" in STEP13-19.

After the catalytic converter 4 is judged as being deteriorated and the flag F/CATNG is set to "1", the alarm generator 101 generates an alarm in STEP13-20, prompting the user to replace the catalytic converter 4.

In the third embodiment, a deterioration of the catalytic converter 4 can appropriately be determined while the air-fuel ratio control system is controlling the air-fuel ratio of the internal combustion engine 1 to enable the catalytic converter 4 to perform an optimum emission purifying capability. Since a rate of change of the target air-fuel ratio KCMD with respect to a change of the amount of the exhaust gas flowing through the catalytic converter 4, more specifically, the deviation DKCMD between the average value KCMD/H of the target air-fuel ratio KCMD while the internal combustion engine 1 is operating under a high load and the average value KCMD/L of the target air-fuel ratio KCMD while the internal combustion engine 1 is operating under a low load, is used for judging whether the catalytic converter 4 is deteriorated or not, even if the target air-fuel ratio KCMD suffers an offset with respect to each air-fuel ratio control system due to product variations of the $O_2$ sensor, the deviation DKCMD is not affected by such an offset. Therefore, it is not necessary to adjust the reference value for judging a deterioration of the catalytic converter 4 with respect to each air-fuel ratio control system, and a deterioration of the catalytic converter 4 can properly be judged simply by comparing the deviation DKCMD with the reference value.

The first through third embodiments described above belong to a first mode of the present invention. However, the first through third embodiments may also be incorporated according to a second mode of the present invention. Specifically, the above air-fuel ratio control system controls the air-fuel ratio of the internal combustion engine 1 such that the pre-CAT A/F (=KACT) detected by the LAF sensor 6 will converge toward the target air-fuel ratio KCMD (KACT=KCMD). Therefore, basically, the pre-CAT A/F (the air-fuel ratio of the exhaust gas actually supplied to the catalytic converter 4) will be brought into conformity with the target air-fuel ratio KCMD while the air-fuel ratio control system is in operation. Consequently, a deterioration of the catalytic converter 4 can be judged by using the detected value KACT of the pre-CAT A/F from the LAF sensor 6, instead of the target air-fuel ratio KCMD, in the first through third embodiments. In the second mode of the present invention which covers the first through third embodiments, therefore, the detected value KACT of the pre-CAT A/F from the LAF sensor 6 is used instead of the target air-fuel ratio KCMD. According to the second mode of the present invention, consequently, the detected value KACT of the preCAT A/F from the LAF sensor 6 is used instead of the target air-fuel ratio KCMD for determining a deterioration of the catalytic converter 4 in the first through third embodiments.

In the first through third embodiments described above (including the second mode of the invention), the average value of the target air-fuel ratio KCMD or the detected air-fuel ratio KACT, the correlation between the target air-fuel ratio KCMD or the detected air-fuel ratio KACT and the operating states of the catalytic converter 4 (specifically the amount of the exhaust gas), or a rate of change of the target air-fuel ratio KCMD or the detected air-fuel ratio KACT with respect to a change of the operating states of the catalytic converter 4 is used to determine a deteriorated state of the catalytic converter 4. However, single or plural data of the target air-fuel ratio KCMD or the detected air-fuel ratio KACT may be compared with a predetermined reference value (e.g., the reference value K0 shown in FIG. 10), and the catalytic converter 4 may be judged as being deteriorated if the data are shifted from the reference value toward the leaner side.

In such a modification, the reference value is established depending on the amount of the exhaust gas according to the reference curve indicated by the dotted line in FIG. 12, and the single or plural data of the target air-fuel ratio KCMD or the detected air-fuel ratio KACT are compared with the reference value corresponding to the amount of the exhaust gas which is detected when the data are produced, for thereby judging a deterioration of the catalytic converter 4. Furthermore, the reference value may be established so as to depend on not only the amount of the exhaust gas but also the active state of the catalytic converter 4, and the single or plural data of the target air-fuel ratio KCMD or the detected air-fuel ratio KACT may be compared with the amount of the exhaust gas and the active state of the catalytic converter 4 which are detected when the data are produced, for thereby judging a deterioration of the catalytic converter 4.

Alternatively, single or plural data of the target air-fuel ratio KCMD or the detected air-fuel ratio KACT which are produced when the catalytic converter 4 is in a predetermined operating state (a particular state of the amount of the exhaust gas or the activation of the catalytic converter 4) may be compared with a reference value corresponding to the above operating state, for thereby judging a deterioration of the catalytic converter 4.

Figure 14:
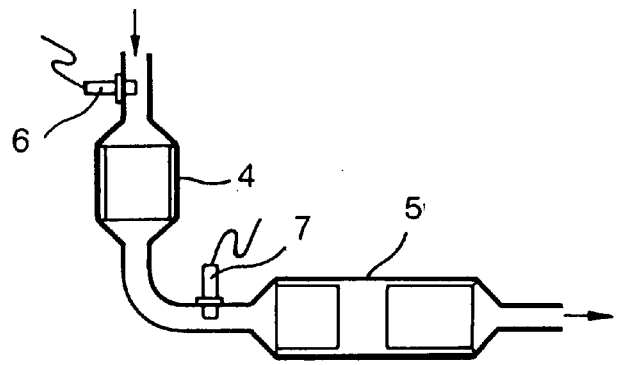
FIG. 14(a) is a schematic view of an air-fuel ratio control system for an internal combustion engine.
FIG. 14(b) is a schematic view of another air-fuel ratio control system for an internal combustion engine.
FIG. 14(c) is a schematic view of still another air-fuel ratio control system for an internal combustion engine.
FIG. 14(d) is a schematic view of yet still another air-fuel ratio control system for an internal combustion engine.
FIG. 14(e) is a schematic view of a further air-fuel ratio control system for an internal combustion engine.
Figure 14:
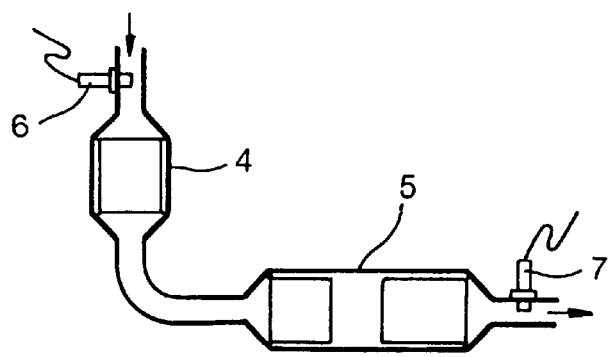
Figure 14:
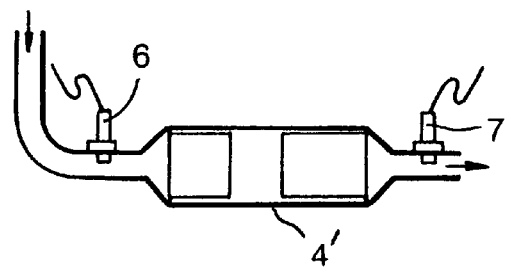
Figure 14:
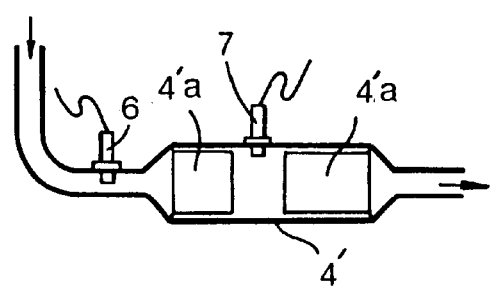
Figure 14:
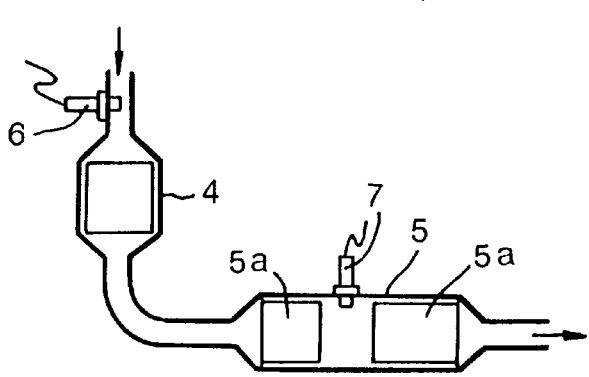

In each of the above embodiments, a deterioration of the catalytic converter 4 is judged using the air-fuel ratio control system having the two catalytic converters 4, 5 in the exhaust system, with the LAF sensor 6 and the $O_2$ sensor 7 being positioned respectively upstream and downstream of the upstream catalytic converter 4, as shown in FIG. 14(*a*). However, as shown in FIG. 14(*b*), the present invention is applicable to an air-fuel ratio control system having an LAF sensor 6 and an $O_2$ sensor 7 which are positioned respectively upstream of the catalytic converter 4 and downstream of the catalytic converter 5. Furthermore, as shown in FIG. 14(*c*), the present invention is also applicable to an air-fuel ratio control system having a single catalytic converter 4' and an LAF sensor 6 and an $O_2$ sensor 7 which are positioned respectively upstream and downstream of the catalytic converter 4'. Moreover, as shown in FIG. 14(*d*), the present invention is further applicable to an air-fuel ratio control system having a single catalytic converter 4' and an LAF sensor 6 disposed upstream of the catalytic converter 4', the catalytic converter 4' including a plurality of (two in FIG. 14(*d*)) catalytic beds 4'a with an $O_2$ sensor 7 positioned downstream of one of the catalytic beds 4'a. Alternatively, as shown in FIG. 14(*e*), the present invention is also applicable to an air-fuel ratio control system having two catalytic converters 4, 5 in the exhaust system and an LAF sensor 6 positioned upstream of the upstream catalytic converter 4, the downstream catalytic converter 5 including a plurality of (two in FIG. 14(*e*)) catalytic beds 5a with an $O_2$ sensor 7 positioned downstream of one of the catalytic beds 5a.

In each of the above embodiments, a deterioration of the catalytic converter 4 is judged while the catalytic converter 4 is being sufficiently activated. However, the reference value T0 or K0 shown in FIG. 10 in the first embodiment, the reference curve shown in FIG. 12 in the second embodiment, and the reference value in the third embodiment may be established depending on the active state of the catalytic converter 4, so that it is possible to judge a deterioration of the catalytic converter 4 irrespective of not only the amount of the exhaust gas but also the active state of the catalytic converter 4.

In the second and third embodiments, the amount of the exhaust gas is recognized on the basis of the basic fuel injection quantity Tim. However, the amount of the exhaust gas may be recognized on the basis of the demand fuel injection quantity Tcyl that is generated by correcting the basic fuel injection quantity Tim with the first correction coefficient KTOTAL and the second correction coefficient KCMDM, or a value produced by correcting the demand fuel injection quantity Tcyl with the feedback correction coefficient KFB. Alternatively, the amount of the exhaust gas may be calculated from the rotational speed and intake pressure of the internal combustion engine 1 according to an approximating equation, or the amount of the exhaust gas or a rate of intake air corresponding thereto may be directly detected using a flow rate sensor such as an air flow sensor or the like.

In the above embodiments, the air-fuel ratio control system which uses the $O_2$ sensor for detecting the concentration of oxygen as a sensor for detecting the amount of a certain component of the exhaust gas downstream of the catalytic converter has been described. However, the present invention is also applicable to an air-fuel ratio control system having a sensor disposed downstream of the catalytic converter for detecting NOx, hydrocarbon, or CO, the air-fuel ratio control system being capable of controlling an air-fuel ratio to minimize the concentration of a gas detected by the sensor, i.e., to maximize the purification percentage in the catalytic converter of NOx, hydrocarbon, or CO.

In each of the above embodiments, the air-furl ratio of the exhaust gas upstream of the catalytic converter is shifted toward the leaner side as the catalytic converter is deteriorated. However, a deterioration of the catalytic converter may also be judged in the case where the air-furl ratio of the exhaust gas upstream of the catalytic converter is shifted toward the richer side as the catalytic converter is deteriorated, e.g., if the catalytic converter is combined with an internal combustion engine which uses CNG as a fuel. In this case, the catalytic converter may be judged as being deteriorated when the target air-fuel ratio or the detected air-fuel ratio upstream of the catalytic converter is shifted toward the richer side of a certain reference value.

In the air-fuel ratio control system according to each of the above embodiments, the air-fuel ratio of the internal combustion engine 1 is feedback-controlled so as to converge the air-fuel ratio KACT detected by the LAF sensor 6 toward the target air-fuel ratio KCMD. However, the air-fuel ratio of the internal combustion engine 1 may be feed-forward-controlled on the basis of the target air-fuel ratio KCMD. In the first embodiment, furthermore, the air-fuel ratio of the internal combustion engine 1 may not necessarily be controlled depending on the target air-fuel ratio KCMD, but may be controlled independently of the target air-fuel ratio KCMD.

In the above embodiments, a deterioration of the catalytic converter 4 installed in the exhaust system of the internal combustion engine 1 is judged. If the catalytic converter 4 is solely to be judged for its deteriorated state, then an exhaust gas produced by burning an air-fuel mixture with a combustion device separate from the internal combustion engine 1 may be supplied to the catalytic converter 4.

Although certain preferred embodiments of the present invention have been shown and described in detail, it should be understood that various changes and modifications may be made therein without departing from the scope of the appended claims.

What is claimed is:

1. A method of judging a deterioration of a catalytic converter for purifying an exhaust gas produced by burning a mixture of a fuel and air, comprising the steps of:
   supplying the exhaust gas to the catalytic converter;
   detecting the amount of a predetermined component of the exhaust gas which has passed through the catalytic converter with an exhaust gas sensor disposed downstream of the catalytic converter;
   calculating a target air-fuel ratio for the exhaust gas to be supplied to the catalytic converter for achieving a predetermined emission purifying capability of the catalytic converter based on a detected output signal from said exhaust gas sensor; and
   judging a deteriorated state of the catalytic converter based on the calculated target air-fuel ratio.

2. A method according to claim 1, further comprising the step of controlling the air-fuel ratio of the mixture so as to equalize the air-fuel ratio of the exhaust gas supplied to the catalytic converter with said target air-fuel ratio.

3. A method according to claim 2, wherein said step of controlling the air-fuel ratio of the mixture comprises the steps of detecting the air-fuel ratio of the exhaust gas supplied to the catalytic converter with an air-fuel ratio sensor disposed upstream of the catalytic converter, and feedback-controlling the air-fuel ratio of the mixture so as to converge a detected output signal from said air-fuel ratio sensor toward said target air-fuel ratio.

4. A method according to claim 3, wherein said step of feedback-controlling the air-fuel ratio of the mixture comprises the step of controlling the air-fuel ratio of the mixture based on an output signal from a recursive-type feedback controller for being supplied with the calculated target air-fuel ratio and the detected output signal from said air-fuel ratio sensor and calculating and outputting a control quantity to adjust the air-fuel ratio of the mixture so as to converge the detected output signal toward said target air-fuel ratio.

5. A method according to any one of claims 1 through 4, wherein said catalytic converter comprises a catalytic converter disposed in an exhaust system of an internal combustion engine for burning said mixture therein.

6. A method according to claim 1 or 2, wherein said catalytic converter comprises a catalytic converter disposed in an exhaust system connected to cylinders of an internal combustion engine for burning said mixture in said cylinders, further comprising the steps of detecting the air-fuel ratio of the exhaust gas supplied to the catalytic converter with an air-fuel ratio sensor disposed upstream of said catalytic converter, and controlling the air-fuel ratio of the mixture in each of the cylinders to eliminate variations of the air-fuel ratio of the mixture in the cylinders.

7. A method according to claim 3 or 4, wherein said catalytic converter comprises a catalytic converter disposed in an exhaust system connected to cylinders of an internal combustion engine for burning said mixture in said cylinders, and wherein said step of controlling the air-fuel ratio of the mixture comprises the step of controlling the air-fuel ratio of the mixture in each of the cylinders to eliminate variations of the air-fuel ratio of the mixture in the cylinders based on the detected output signal from said air-fuel ratio sensor.

8. A method according to claim 1, wherein said step of judging a deteriorated state of the catalytic converter comprises the step of judging a deteriorated state of the catalytic converter based on a plurality of data of said target air-fuel ratio which are determined when the exhaust gas is supplied to said catalytic converter.

9. A method according to claim 1, wherein said step of judging a deteriorated state of the catalytic converter comprises the step of judging a deteriorated state of the catalytic converter by comparing, with predetermined reference data, at least one item of data of said target air-fuel ratio which is determined when the exhaust gas is supplied to said catalytic converter or data generated by processing said data of said target air-fuel ratio and representing a degree of deterioration of said catalytic converter.

10. A method according to claim 9, wherein said reference data is established depending on an operating state of said catalytic converter.

11. A method according to claim 1, wherein said step of judging a deteriorated state of the catalytic converter comprises the step of judging a deteriorated state of the catalytic converter by comparing, with predetermined reference data, at least one item of data of said target air-fuel ratio which is determined when the exhaust gas is supplied to said catalytic converter, and determining whether the data of the target air-fuel ratio is on a leaner side or a richer side of said reference value.

12. A method according to claim 11, wherein said reference data is established depending on an operating state of said catalytic converter, and depends on the operating state of said catalytic converter at the time said target air-fuel ratio is calculated.

13. A method according to claim 11, wherein said data of the target air-fuel ratio comprises data of the target air-fuel ratio determined in a predetermined operating state of the catalytic converter.

14. A method according to claim 1, wherein said step of judging a deteriorated state of the catalytic converter comprises the step of judging a deteriorated state of the catalytic converter by generating an average value of a plurality of data of the target air-fuel ratio which is determined when the exhaust gas is supplied to said catalytic converter, as data representing a degree of deterioration of the catalytic converter, and comparing said data representing a degree of deterioration of the catalytic converter with a predetermined reference value.

15. A method according to claim 14, wherein said plurality of data of the target air-fuel ratio comprise data of the target air-fuel ratio determined in a predetermined operating state of the catalytic converter.

16. A method according to claim 1, wherein said step of judging a deteriorated state of the catalytic converter comprises the step of judging a deteriorated state of the catalytic converter by generating a correlation between the target air-fuel ratio and operating states of the catalytic converter from a plurality of data of the target air-fuel ratio which are determined in the operating states of the catalytic converter when the exhaust gas is supplied to said catalytic converter, as data representing a degree of deterioration of the catalytic converter, and comparing said correlation with a predetermined reference characteristic depending on the operating states of the catalytic converter.

17. A method according to claim 16, wherein said correlation is determined from the plurality of data of the target air-fuel ratio according to a method of least squares or a successive method of least squares.

18. A method according to claim 1, wherein said step of judging a deteriorated state of the catalytic converter comprises the step of judging a deteriorated state of the catalytic converter by generating a rate of change of the target air-fuel ratio with respect to a change in operating states of the catalytic converter from a plurality of data of the target air-fuel ratio which are determined in the operating states of the catalytic converter when the exhaust gas is supplied to said catalytic converter, as data representing a degree of deterioration of the catalytic converter, and comparing said data representing a degree of deterioration of the catalytic converter with a predetermined reference value.

19. A method according to any one of claims 10, 12, 13, 15, 16, 17, and 18, wherein said operating states of the catalytic converter include at least the amount of the exhaust gas flowing through said catalytic converter.

20. A method of judging a deterioration of a catalytic converter for purifying an exhaust gas produced by burning a mixture of a fuel and air, comprising the steps of:

supplying the exhaust gas to the catalytic converter;

detecting the amount of a predetermined component of the exhaust gas which has passed through the catalytic converter with an exhaust gas sensor disposed downstream of the catalytic converter;

calculating a target air-fuel ratio for the exhaust gas to be supplied to the catalytic converter for achieving a predetermined emission purifying capability of the catalytic converter based on a detected output signal from said exhaust gas sensor;

controlling the air-fuel ratio of the mixture so as to equalize the air-fuel ratio of the exhaust gas supplied to the catalytic converter with said target air-fuel ratio;

detecting the air-fuel ratio of the exhaust gas supplied to the catalytic converter while the air-fuel ratio of the mixture is being controlled, with an air-fuel ratio sensor disposed upstream of the catalytic converter; and judging a deteriorated state of the catalytic converter based on a detected output signal from said air-fuel ratio sensor.

21. A method according to claim 20, wherein said step of controlling the air-fuel ratio of the mixture comprises the step of feedback-controlling the air-fuel ratio of the mixture so as to converge the detected output signal from said air-fuel ratio sensor toward said target air-fuel ratio.

22. A method according to claim 21, wherein said step of feedback-controlling the air-fuel ratio of the mixture comprises the step of controlling the air-fuel ratio of the mixture based on an output signal from a recursive-type feedback controller for being supplied with the calculated target air-fuel ratio and the detected output signal from said air-fuel ratio sensor and calculating and outputting a control quantity to adjust the air-fuel ratio of the mixture so as to converge the detected output signal toward said target air-fuel ratio.

23. A method according to any one of claims 20 through 22, wherein said catalytic converter comprises a catalytic converter disposed in an exhaust system of an internal combustion engine for burning said mixture therein.

24. A method according to claim 23, wherein said catalytic converter comprises a catalytic converter disposed in an exhaust system connected to cylinders of an internal combustion engine for burning said mixture in said cylinders, and wherein said step of controlling the air-fuel ratio of the mixture comprises the step of controlling the air-fuel ratio of the mixture in each of the cylinders to eliminate variations of the air-fuel ratio of the mixture in the cylinders based on the detected output signal from said air-fuel ratio sensor.

25. A method according to claim 20, wherein said step of judging a deteriorated state of the catalytic converter comprises the step of judging a deteriorated state of the catalytic converter based on a plurality of data of said target air-fuel ratio which are determined when the exhaust gas is supplied to said catalytic converter.

26. A method according to claim 20, wherein said step of judging a deteriorated state of the catalytic converter comprises the step of judging a deteriorated state of the catalytic converter by comparing, with predetermined reference data, at least one item of data of the detected output signal from said air-fuel ratio sensor which is produced when the exhaust gas is supplied to said catalytic converter or data generated by processing said data of the detected output signal and representing a degree of deterioration of said catalytic converter.

27. A method according to claim 26, wherein said reference data is established depending on an operating state of said catalytic converter.

28. A method according to claim 20, wherein said step of judging a deteriorated state of the catalytic converter comprises the step of judging a deteriorated state of the catalytic converter by comparing, with predetermined reference data, at least one item of data of the detected output signal from said air-fuel ratio sensor which is produced when the exhaust gas is supplied to said catalytic converter, and determining whether the data of the detected output signal is on a leaner side or a richer side of said reference value.

29. A method according to claim 28, wherein said reference data is established depending on an operating state of said catalytic converter, and depends on the operating state of said catalytic converter at the time said target air-fuel ratio is calculated.

30. A method according to claim 28, wherein said data of the detected output signal comprises data of the target air-fuel ratio determined in a predetermined operating state of the catalytic converter.

31. A method according to claim 20, wherein said step of judging a deteriorated state of the catalytic converter comprises the step of judging a deteriorated state of the catalytic converter by generating an average value of a plurality of data of the detected output signal from said air-fuel ratio sensor which are determined when the exhaust gas is supplied to said catalytic converter, as data representing a degree of deterioration of the catalytic converter, and comparing said data representing a degree of deterioration of the catalytic converter with a predetermined reference value.

32. A method according to claim 31, wherein said plurality of data of the detected output signal from said air-fuel ratio sensor comprise data produced by said air-fuel ratio sensor in a predetermined operating state of the catalytic converter.

33. A method according to claim 20, wherein said step of judging a deteriorated state of the catalytic converter comprises the step of judging a deteriorated state of the catalytic converter by generating a correlation between the detected output signal from said air-fuel ratio sensor and operating states of the catalytic converter from a plurality of data of the detected output signal from said air-fuel ratio sensor which are determined in the operating states of the catalytic converter when the exhaust gas is supplied to said catalytic converter, as data representing a degree of deterioration of the catalytic converter, and comparing said correlation with a predetermined reference characteristic depending on the operating states of the catalytic converter.

34. A method according to claim 33, wherein said correlation is determined from the plurality of data of the detected output signal from said air-fuel ratio sensor according to a method of least squares or a successive method of least squares.

35. A method according to claim 20, wherein said step of judging a deteriorated state of the catalytic converter comprises the step of judging a deteriorated state of the catalytic converter by generating a rate of change of the detected output signal from said air-fuel ratio sensor with respect to a change in operating states of the catalytic converter from a plurality of data of the detected output signal from said air-fuel ratio sensor which are determined in the operating states of the catalytic converter when the exhaust gas is supplied to said catalytic converter, as data representing a degree of deterioration of the catalytic converter, and comparing said data representing a degree of deterioration of the catalytic converter with a predetermined reference value.

36. A method according to any one of claims 27, 29, 30, 32, 33, 34, and 35, wherein said operating states of the catalytic converter include at least the amount of the exhaust gas flowing through said catalytic converter.

37. A method according to claim 1 or 20, wherein said step of calculating a target air-fuel ratio comprises the step of determining the target air-fuel ratio such that the detected output signal from said exhaust gas sensor will be of a predetermined value.

38. A method according to claim 37, wherein said exhaust gas sensor comprises an oxygen concentration sensor for detecting the concentration of oxygen in the exhaust gas which has passed through said catalytic converter, as the predetermined component of the exhaust gas, and said predetermined value comprises a constant value.

39. A method according to claim 37, wherein said step of calculating a target air-fuel ratio comprises the step of determining a target air-fuel ratio based on an output signal from a sliding mode controller for being supplied with the detected air-fuel ratio from said exhaust gas sensor and calculating and outputting a control quantity to adjust the air-fuel ratio of the exhaust gas to be supplied to the catalytic converter so as to converge the detected output signal toward said predetermined value.

40. A method according to claim 1 or 20, further comprising the step of generating an alarm when the catalytic converter is judged as being in a deteriorated state.

\* \* \* \* \*